(12) United States Patent
Takamori et al.

(10) Patent No.: US 6,599,210 B1
(45) Date of Patent: Jul. 29, 2003

(54) SPROCKET

(75) Inventors: Norihiko Takamori, Kyoto (JP); Jichu Oh, Auburn (AU)

(73) Assignees: Sunstar Giken Kabushiki Kaisha, Osaka (JP); Uni-Sunstar B.V., Amsterdam (NL)

( * ) Notice: Subject to any disclaimer, the term of this patent is extended or adjusted under 35 U.S.C. 154(b) by 0 days.

(21) Appl. No.: 09/622,836

(22) PCT Filed: Feb. 26, 1998

(86) PCT No.: PCT/JP98/00784
§ 371 (c)(1),
(2), (4) Date: Aug. 16, 2001

(87) PCT Pub. No.: WO99/43970
PCT Pub. Date: Sep. 2, 1999

(51) Int. Cl.[7] ............................ F16H 55/30; F16H 55/12
(52) U.S. Cl. .......................... 474/152; 474/158; 474/162
(58) Field of Search .................. 474/160, 152, 474/156, 161, 155, 157, 153, 95, 903, 148, 164, 158

(56) References Cited

U.S. PATENT DOCUMENTS

| | | | | | |
|---|---|---|---|---|---|
| 616,537 A | * | 12/1898 | Bufford | ...................... | 406/106 |
| 2,953,930 A | * | 9/1960 | Meyer | ....................... | 474/148 |
| 3,144,782 A | * | 8/1964 | Edmunson | ................... | 474/158 |
| 3,279,272 A | * | 10/1966 | Gudmundsen | .............. | 474/164 |
| 3,683,980 A | * | 8/1972 | Gasner | ....................... | 474/156 |
| 3,962,929 A | * | 6/1976 | Silvon | ......................... | 474/152 |
| 4,531,926 A | * | 7/1985 | Reeves, Jr. | .................. | 474/162 |
| 4,752,281 A | * | 6/1988 | Lammers | ..................... | 474/162 |
| 5,984,817 A | * | 11/1999 | Schulz | ........................ | 474/156 |
| 6,283,255 B1 | * | 9/2001 | Gardner et al. | ........... | 188/71.6 |

FOREIGN PATENT DOCUMENTS

| | | | |
|---|---|---|---|
| DE | 2816137 A1 | * | 10/1979 |
| DE | 4312759 A1 | * | 10/1994 |
| JP | 49-113052 | | 9/1974 |
| JP | 52-10256 | | 1/1977 |
| JP | 52-163661 | | 12/1977 |
| JP | 60-104866 | | 6/1985 |
| JP | 10-110806 | | 4/1998 |

* cited by examiner

*Primary Examiner*—Marcus Charles
(74) *Attorney, Agent, or Firm*—Wenderoth, Lind & Ponack, L.L.P.

(57) ABSTRACT

A sprocket has a mounting part for mounting on a wheel and a corrugated section provided with teeth for engagement with a chain such that the sprocket has a reduces volume and weight and allows for appropriate engagement with the chain by having the position of the sprocket agree with the position of the chain. The mounting part has a first raised section raised toward a one plate surface side and a second raised section raised toward another plate surface side with respect to a longitudinally central plane extending through a center of the sprocket so as to divide the total volume and weight of the sprocket into substantially equal sections. A flat top part of the first raised section having a mounting hole is on a level with a bottommost end surface of the sprocket.

21 Claims, 22 Drawing Sheets

A CROSS SECTION TAKEN ALONG THE LINE II-II (A)  $T1 = \frac{1}{3} T2$ (B)  $T1' = \frac{2}{3} T2$

SPROCKET

TECHNICAL FIELD

The present invention relates to a sprocket for a power transmission device of a winding type to transmit power or any other force through a chain. More particularly, the present invention relates to a sprocket having a reduced volume, weight or the like by using material for a thin plate or the like, that can realize an appropriate engagement of the sprocket with a chain by bringing the position of the sprocket into agreement with the position of the chain, and that can prevent an occurrence of a flat curvature or warp upon hardening.

BACKGROUND TECHNOLOGY

Generally, a transmission unit of a winding type using a chain and a sprocket has been adopted for extensive use in a power transmission system of motorcycles, bicycles or industrial machines. The shapes and sizes of the chain and the sprocket for use in this transmission unit are specified and defined as JIS (Japanese Industrial Standards) B1801.

As conventional sprockets, there is provided, for example, a normal sprocket product as shown in FIG. 32(a). This drawing (FIG. 32(a)) depicts a sectional view of a side portion of a normal sprocket product, a sectional view of the sprocket on a longitudinally central plane extending through and over the center of the sprocket, when looked at from direction A and from direction B, a sectional view of the side portion thereof when mounted on a wheel, and a sectional view of the side portion thereof showing a status of warp upon hardening the sprocket. FIGS. 32(b) and 32(c) depict the same illustrations for different sprocket products. In the drawings, a hatched portion in each of the sectional view of the side portions and the sectional view on the longitudinally central plane indicates the presence of material or a member.

As shown in FIG. 32(a), the conventional sprocket product can be mounted on a wheel in a state in which the bottommost end surface (or the uppermost end surface) of the sprocket is engaged with the surface of a flange of the wheel. Therefore, the position of the sprocket is brought into agreement with the position of the chain upon mounting on the wheel, so that the teeth sections of the sprocket can be engaged with the chain in an appropriate fashion. Further, as the upper half portion and the lower half portion of the sprocket from the longitudinally central plane are symmetrical with each other with respect to the longitudinally central plane, the sprocket can present the advantages that it does not cause or causes little warp or curving upon hardening for improving durability.

For the conventional sprocket product as shown in FIG. 32(a), however, it suffers from the defects that it is heavy and expensive in cost of production for the sprocket due to high costs for material because it is filled in with such material over the entire area extending from the bottommost end surface to the uppermost end surface, simply excluding hole portions. In order to render the sprocket lightweight, it is considered as a matter of course to render the entire area of the sprocket thinner. On the other hand, a chain engageable with the sprocket is configured such that two sheets of a pin ring plate and a roller ring plate are disposed alternately, which are disposed parallel to each other and they are mechanically connected to each other with pins. Therefore, the acceptable tensile strength of the chain has its own limits. If a chain having a narrower width than the one currently in use would be used, their may be problems with strength of the chain. The sprocket, however, has no mechanical connecting portion therein. Moreover, it has recently been proposed that the sprocket be made of material having high strength and rigidity. In this case, even if the thickness of the sprocket is half of that of the conventional sprocket, substantially the same strength and rigidity can be achieved as a sprocket prepared by using conventional material.

It is further proposed to provide a sprocket, as shown in FIG. 32(b), which is depressed on upper and lower sides and is provided with a corrugated section having an amplitude in the thickness direction at the outer peripheral part of the sprocket and further with teeth at least at the outer edge portions of the top fold parts of the corrugated section (Laid-open Japanese Patent Application No. 8-214,529). This sprocket can dramatically reduce an amount of material to be used for the production of the sprocket and, even if the material would be used in an amount of from a half to one third the conventional sprocket made of a conventional material, the sprocket can achieve substantially the same strength as the conventional sprocket. Moreover, the teeth formed on the corrugated section are disposed alternately in the thickness direction, so that the sprocket can be used in combination with a chain having a conventional width. Furthermore, as the upper half portion and the lower half portion of the sprocket are symmetrical to each other with respect to the longitudinally central plane extending through and over the center of the sprocket, the sprocket can sustain the advantages that no or little warp or curvature may be caused upon hardening.

When the sprocket in this configuration is mounted on an existing wheel, however, the mounting surface at which the sprocket is mounted on the wheel is located above the bottommost end surface of the corrugated section, as shown in FIG. 32(b). Therefore, a new problem may arise that the position of the sprocket is not brought into agreement with the position of a chain.

In order to solve this problem, it is considered to provide a sprocket with one side depressed therein, as shown in FIG. 32(c), in which its mounting surface for mounting on the wheel is thinned, like in the embodiment shown in FIG. 32(b). In this configuration, the sprocket is configured such that the mounting surface of the sprocket for mounting on the wheel can be brought into agreement with the bottommost end surface of the sprocket by placing the mounting surface of the sprocket eccentrically toward one side with respect to the longitudinally central plane extending through the center of the sprocket. Therefore, this configuration can bring the position of the sprocket into agreement with the position of the chain upon mounting on the wheel.

For the sprocket as shown in FIG. 32(c), however, the material is distributed in an asymmetrical manner with respect to the longitudinally central plane extending over and through the center of the sprocket. This asymmetrical distribution of the material over he sprocket may cause warp or curving during the hardening process, and these defects may eventually lead to disagreement of the position of the sprocket with the position of the chain.

SUMMARY OF THE INVENTION

In order to solve the problems as specifically set forth under the above description of the background technology as shown in FIGS. 32(a) to 32(c), the present invention has the object to provide a sprocket that can reduce volume and weight by using material for use in preparing thin plates or the like, that can realize an appropriate state of engagement of the sprocket with a chain by agreeing the position of the sprocket with the position of a chain, and that causes no or little warp or curving on a surface of the sprocket upon hardening the sprocket.

In order to achieve the object, the present invention provides a sprocket comprising at least a mounting part for mounting on a rotary member and an outer peripheral part at which teeth engageable with a chain are formed, wherein the mounting part comprises a first raised section raised toward a first plate surface side and a second raised section raised towards a second plate surface side opposite to said first plate surface side. The term "rotary member" referred to herein is intended to mean any rotary member that can transmit a drive force through a chain, when the sprocket is mounted on the rotary member. Such a rotary member includes, for example, a wheel for use with two-wheel vehicles, bicycles, motorcycles, and so on.

In accordance with the present invention, the sprocket is provided with the mounting part for mounting on a rotary member, in which the first section is raised on the one plate surface side and the second section is raised on the opposite plate surface side. Therefore, when the sprocket is mounted on the rotary member in a state that the top portion of either of the first raised section or the second raised section is engaged with a mounting plane of the rotary member, the position of the sprocket can agree with the position of the chain by adapting the height of the top portion to the position of the chain. This configuration can realize an appropriate engagement of the teeth of the sprocket of the resent invention with the chain.

Should the present invention be applied to the position relationship of the sprocket with the chain as shown in FIG. 32(a), the top portion of the first and second raised sections on the side that engages with the mounting surface of the rotary member is formed as a plane that defines the bottommost end surface of the sprocket as a whole. In this configuration, the top portion of the raised sections on the side that does not engage with the mounting surface thereof can be formed so as to define the uppermost end surface of the, sprocket as a whole. Moreover, it is to be understood as a matter of course that the top portion of each of the first and second raised sections may be disposed on a level with the bottommost end surface and the uppermost end surface of the outer peripheral part. It is to be noted herein that the top portion of each section is preferably flat and the section of the sprocket engageable with the mounting surface of the rotary member may be provided at any appropriate location with a mounting hole through which the sprocket is engaged with the rotary member.

In accordance with the present invention, the first and second raised sections are raised on the respective plate surface sides without rendering the material eccentric toward one plate surface side only, unlike a conventional sprocket product with one side depressed therein as shown in FIG. 32(c). Therefore, the sprocket can lessen an occurrence of warp or curving due to hardening because the material is equally distributed therein, as compared with the conventional sprocket product.

Furthermore, the sprocket according to the present invention is configured such that the first raised section is depressed relatively on the plate surface side corresponding to the other plate surface side toward which the second raised section is raised. Conversely, the second raised section is depressed relatively on the plate surface side corresponding to the one plate surface side toward which the first raised section is raised. This configuration can reduce the volume of the mounting part of the sprocket leading eventually to a reduction in the weight of the sprocket. Further, for instance, this configuration can render the plate thickness of the material of the mounting part smaller than the entire thickness of the outer peripheral part with the teeth formed thereon so as to adapt to a width in which it is engaged with a chain having an ordinary tooth width. Therefore, the total volume and the total weight of the sprocket can be reduced, as compared with the conventional sprocket product disclosed under the background technology (as shown in FIG. 32(a)), in which the mounting part is formed in the same plate thickness as that of the outer peripheral part as a whole. Moreover, the sprocket can further be rendered lighter in weight by locating a hole in the mounting part that extends over its entire thickness.

In accordance with the present invention, the mounting part of the sprocket is preferably configured such that the first raised section is raised toward the one plate surface side with respect to the longitudinally central plane of the sprocket extending through the center of the sprocket and the second raised section is raised toward the other plate surface side with respect to the longitudinally central plane thereof, so as to render the total volume and weight of the sprocket substantially equal between the first raised section and the second raised section. It is to be noted herein that the longitudinally central plane referred to herein is intended to mean a plane that passes through the center of the sprocket in the plate thickness direction perpendicular to the central axis of the axial direction of the sprocket.

By forming the first and second raised sections so as to divide the total volume and weight of the sprocket into substantially equal sections with respect to the longitudinally central plane, an occurrence of warp or curvature upon hardening can be reduced more effectively. Actually, as no or little warp or curvature is caused to occur upon hardening in this case, it is possible to cause the position of the sprocket to thoroughly agree with the position of the chain even after hardening.

The first and second sections can be formed in an optional and appropriate manner within the scope that does not depart from the scope and spirit of the invention. For instance, the first and second sections may each be formed in a plurality or disposed alternately with each other along the peripheral direction. Further, the mounting parts may be disposed so as to become symmetrical to each other with respect to the rotation at a predetermined angle about the central axis of the sprocket. In this instance, the first and second sections are substantially identical in shape with the exception that the plate surface sides toward which they are raised are disposed opposite to each other. Furthermore, the number of the first sections may be identical to the number of the second sections. The sprocket can be prepared with extreme ease in such a shape that the total volume and weight of the sprocket is divided substantially equal with respect to the longitudinally central plane extending through the center of the sprocket by rendering the mounting parts symmetrical to each other by rotation about the central axis of the sprocket. Moreover, this configuration can further reduce an occurrence of warp and curvature upon hardening.

Forming the sprocket as a whole with material having a uniform plate thickness can also attain a further decrease in weight of the sprocket. For instance, the sprocket can be prepared in various shapes with extreme ease by press-processing a circular plate having a uniform plate thickness.

For instance, should the sprocket be rendered lightweight by using material having a plate thickness smaller in width than the width of engagement with the chain, an appropriate state of engagement of the teeth of the sprocket with the chain can be realized by forming the outer peripheral part in the manner as will be described hereinafter. This configuration can also sustain the strength of the chain as well as render the sprocket lightweight.

For instance, the corrugated section having amplitude in the thickness direction is formed at the outer peripheral part along the peripheral direction, and teeth are formed at least at the outer edges of the top portions of the folds of the corrugated section. In this configuration, a pitch of at least one fold of the corrugated section between the top portions thereof is set to be different from a pitch of another fold of the corrugated section between the top portions thereof. In this instance, it is also possible to prepare a sprocket with an odd number of teeth by forming the teeth at an outer edge of the top portion and at an outer edge in an intermediate position of the folded portion between the top portions thereof.

Moreover, the outer peripheral part of the sprocket may be provided at its peripheral portion with the corrugated section having annular folds extending along the peripheral direction and having amplitude in the thickness direction, and teeth may be provided at the peripheral portion of the corrugated section. In addition, thick portions and thin portions may be alternately formed at the outer peripheral part along the peripheral direction and teeth may be formed on outer edge portions of the thick sections. Further, the outer peripheral part of the sprocket may be configured such that each tooth formed at the outer peripheral portion may be provided with two tooth edge portions facing each other in the thickness direction and a groove extending inside in the radial direction may be provided between the two tooth edge portions.

At the outer peripheral part provided with the corrugated section and so on may be disposed a buffer member for use with the object to reduce noises that may be caused by contact with the chain. This can attain a further effect that noises can be reduced.

It is further to be noted herein that the present invention is not restricted to the provision of the corrugated section at the outer peripheral part of the sprocket. For instance, the sprocket of the present invention may be prepared such that the outer peripheral part is made of material having a conventional plate thickness (FIG. 32(*a*)) and only the mounting part is made of material having a thinner plate thickness.

BRIEF DESCRIPTION OF THE ACCOMPANYING DRAWINGS

The detailed configuration, features and advantages of the present invention will become apparent in the course of the following description with reference to the accompanying drawings.

Figure 1:
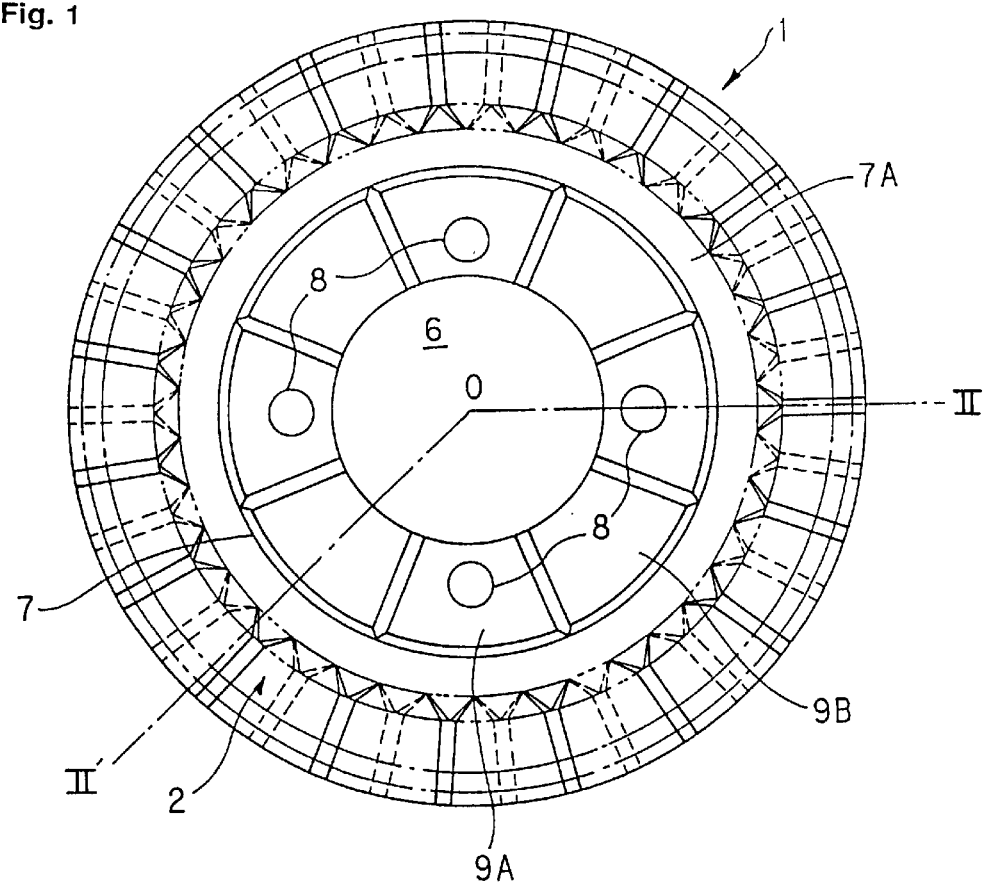
FIG. 1 is a plan view showing a sprocket 1 according to an embodiment of the present invention.
Figure 5:
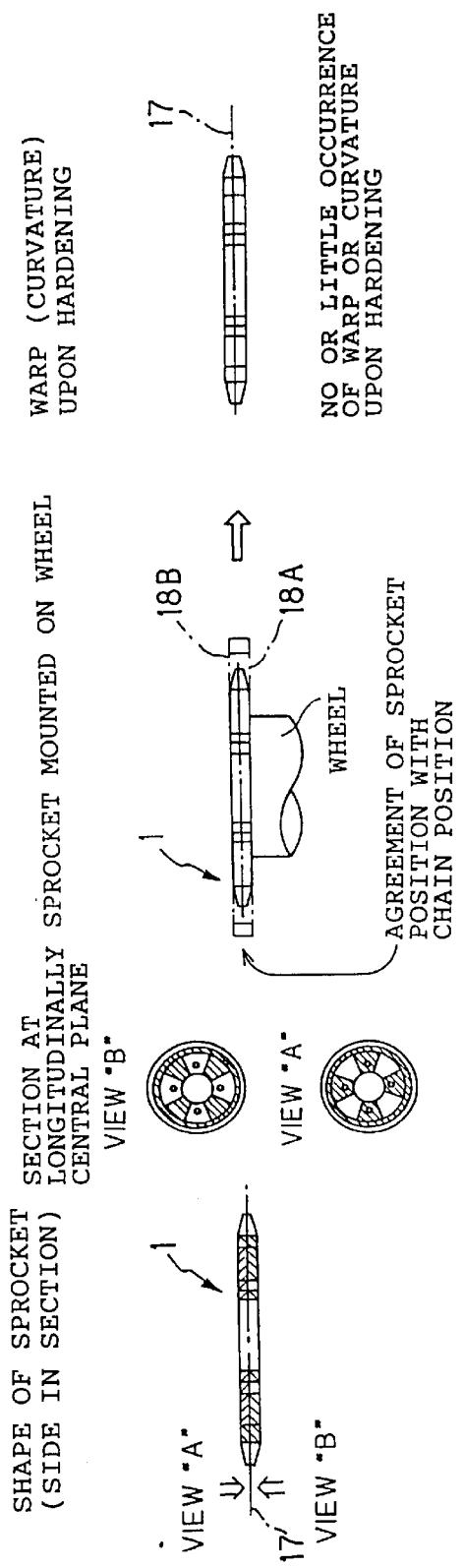

FIG. 5 is a sectional view of the side of the sprocket 1 of FIG. 1, sectional views on the longitudinally central plane of the sprocket when looked from the side A and side B, a side view of the sprocket 1 when mounted on a wheel, and a side view of the sprocket 1 after hardening.

Figure 6:
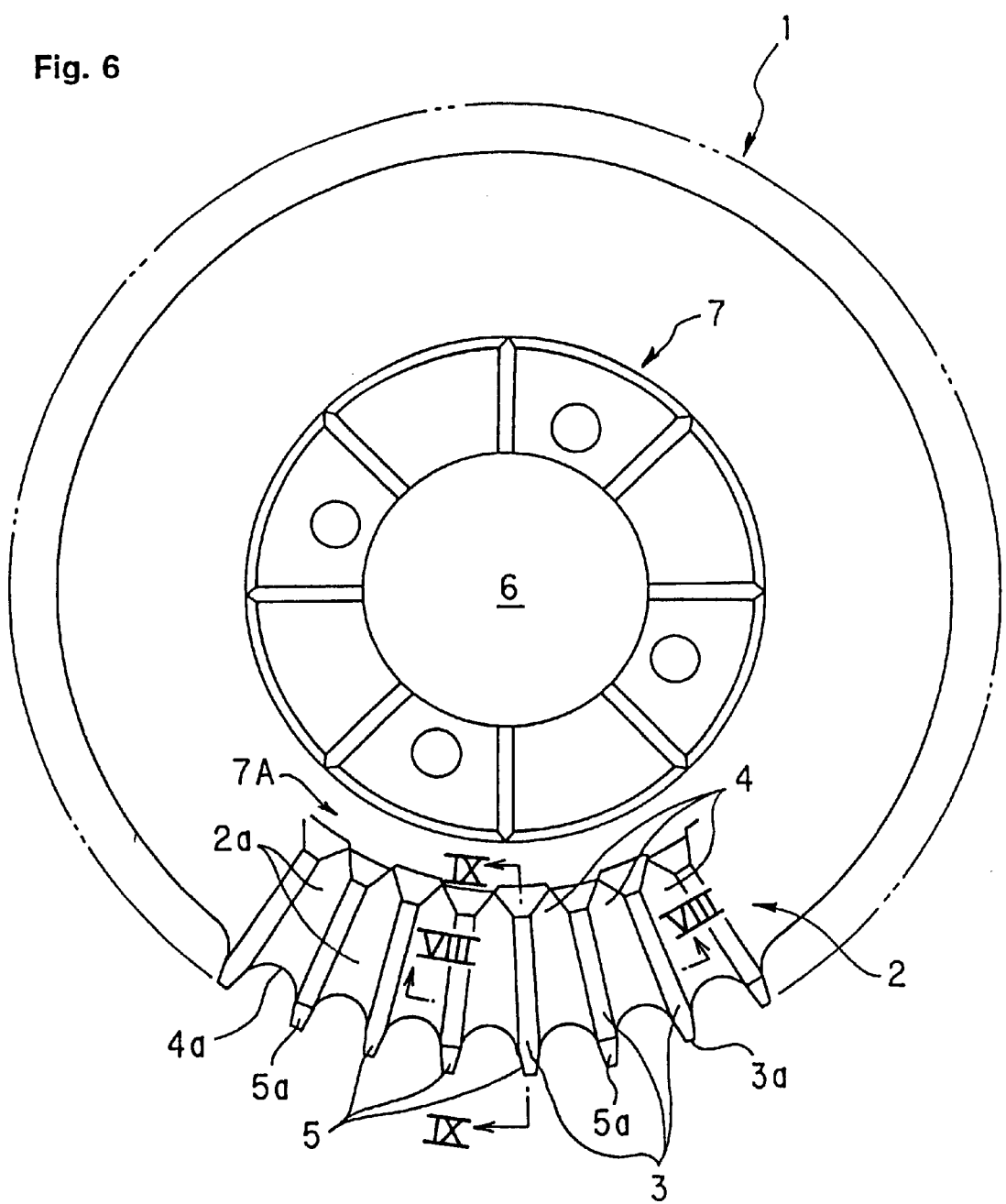

FIG. 6 is a front view showing the details of portions of the corrugated section 2 of the sprocket 1 as shown in FIG. 1.

Figure 7:
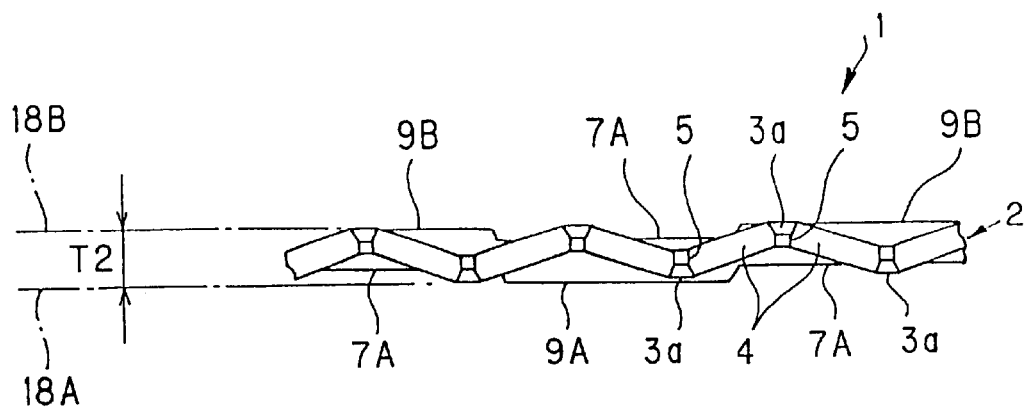

FIG. 7 is a developed view showing the side of the corrugated section 2 of the sprocket 1 of FIG. 6.

Figure 8:
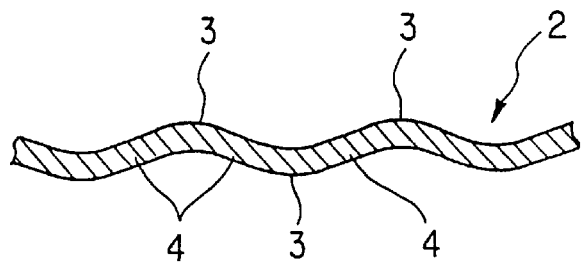

FIG. 8 is a sectional view showing the sprocket 1 when taken along line VIII—VIII of FIG. 6.

Figure 9:
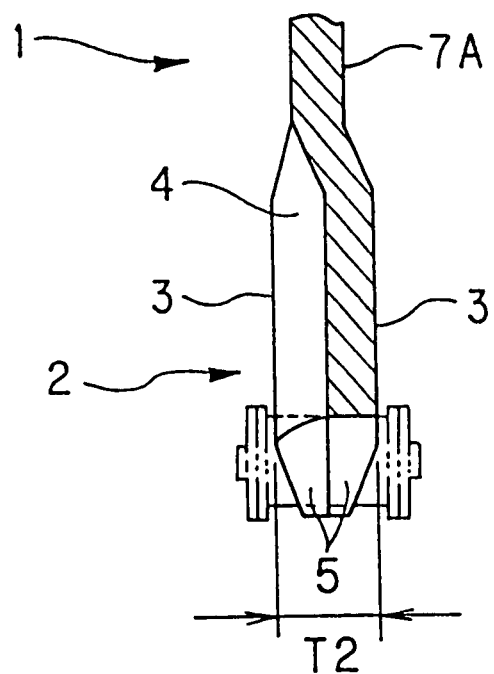

FIG. 9 is a sectional view showing the sprocket 1 when taken along line IX—IX of FIG. 6.

Figure 10:
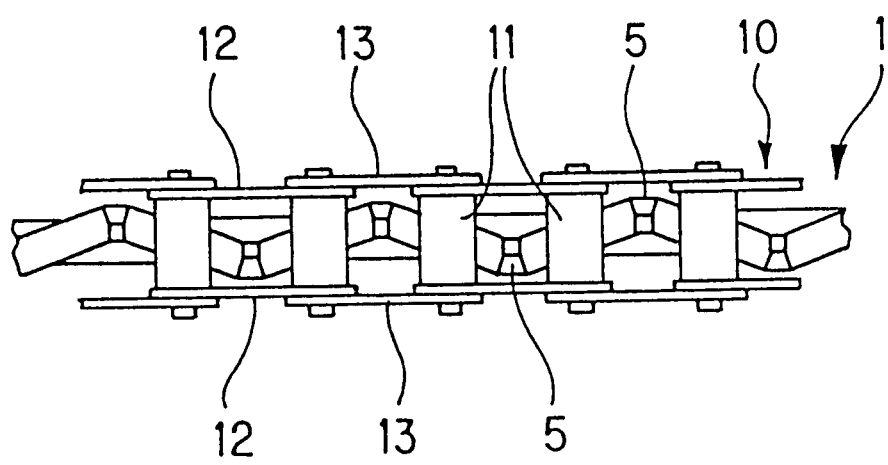

FIG. 10 is a view explaining an engagement status between teeth 5 of the sprocket 1 of FIG. 6 and a chain.

Figure 4:
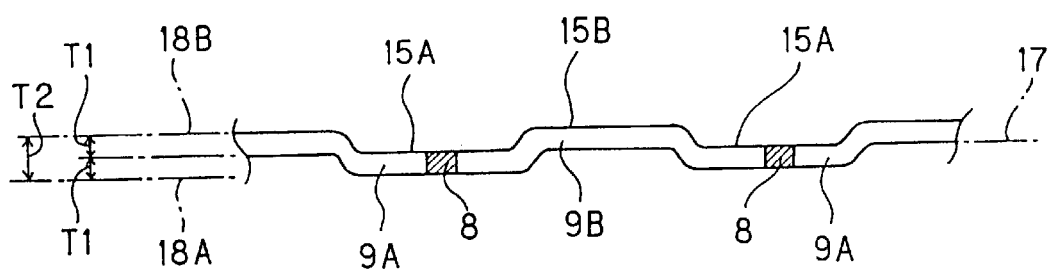
FIG. 4 is a sectional view showing the mounting part 7 when taken along line IV—IV of FIG. 3.
Figure 11:
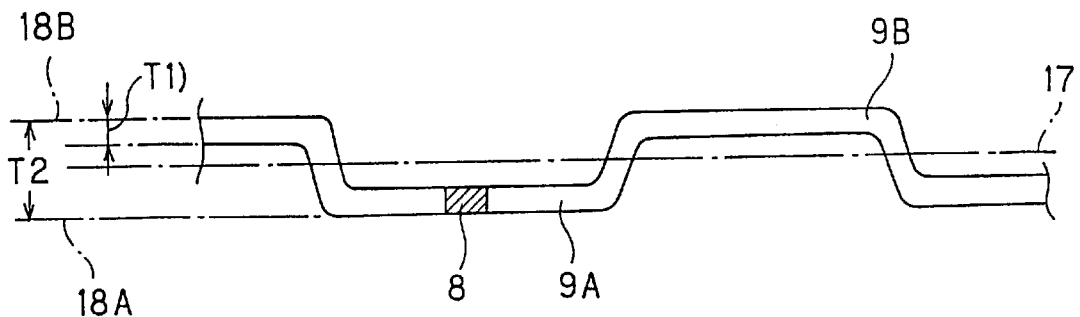
Figure 11:
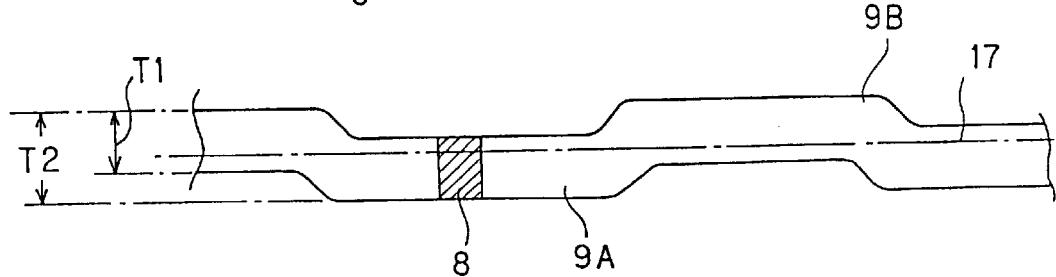

FIG. 11(A) is a view corresponding to FIG. 4, wherein the plate thickness T1 is set to one third of the entire plane thickness T2 of the sprocket.

FIG. 11(B) is a view corresponding to FIG. 4, wherein the plate thickness T1 is set to two thirds of the entire plane thickness T2 of the sprocket.

Figure 12:
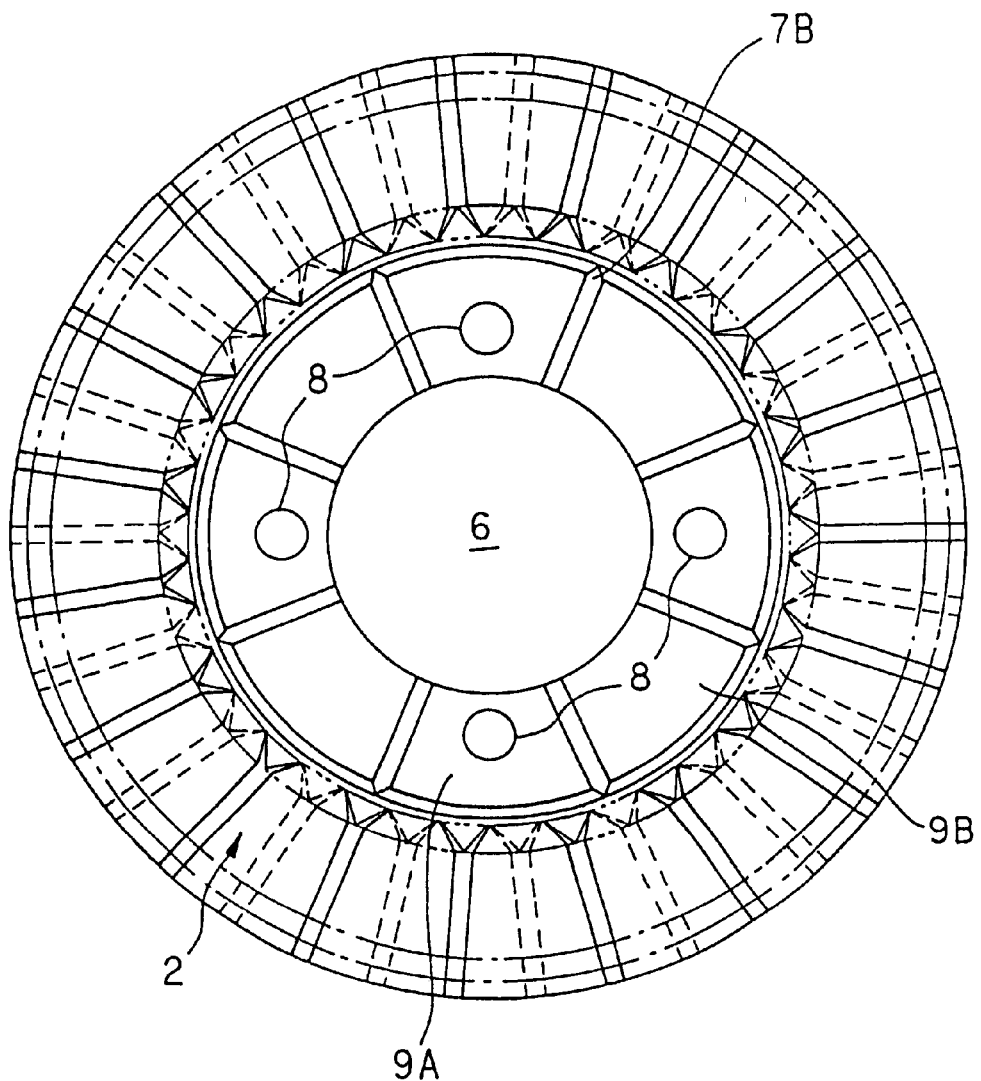

FIG. 12 is a front view showing a sprocket provided with a mounting part 7B as a first variation of the mounting part.

Figure 13:
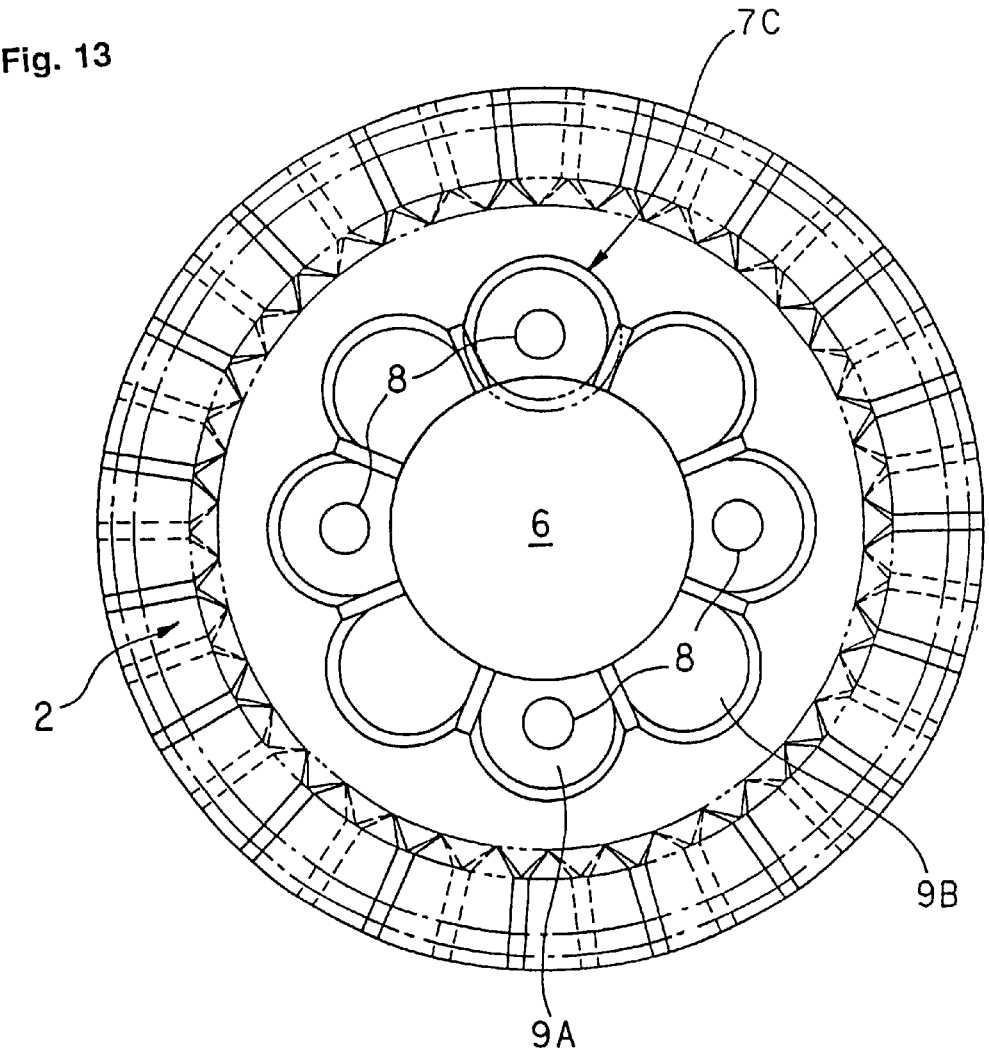

FIG. 13 is a front view showing a sprocket provided with a mounting part 7C as a second variation of the mounting part.

Figure 14:
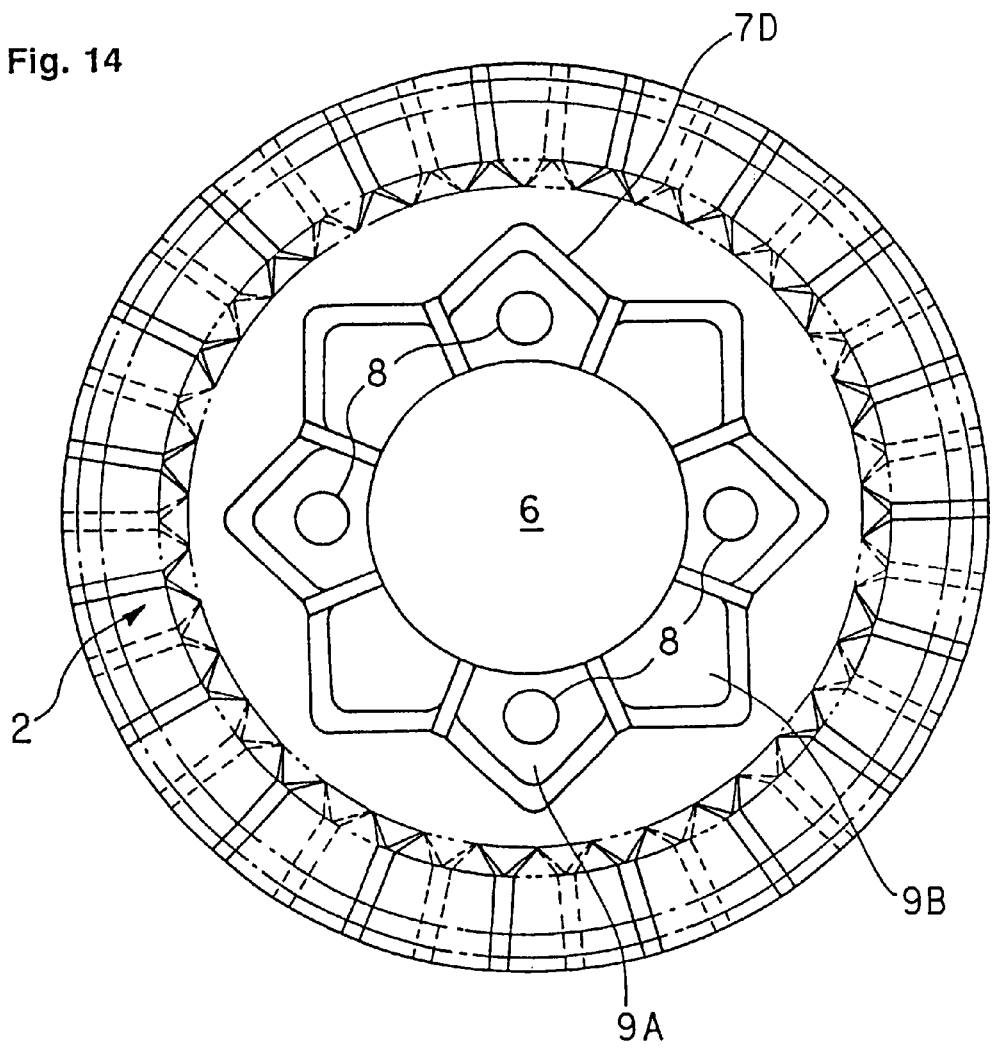

FIG. 14 is a front view showing a sprocket provided with a mounting part 7D as a third variation of the mounting part.

Figure 15:
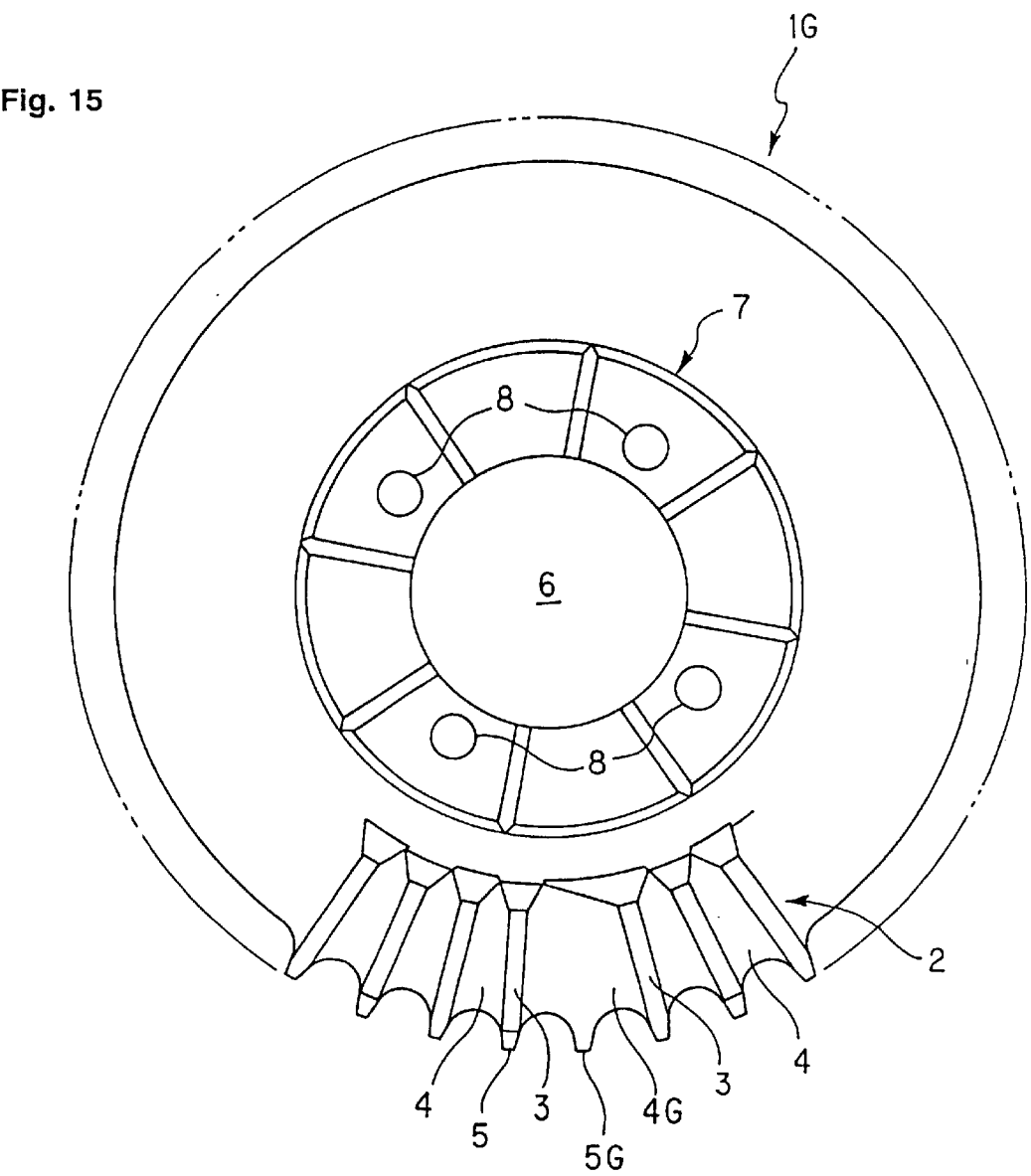

FIG. 15 is a front view showing a sprocket 1G as another embodiment (1) regarding the outer peripheral part of the sprocket.

Figure 16:
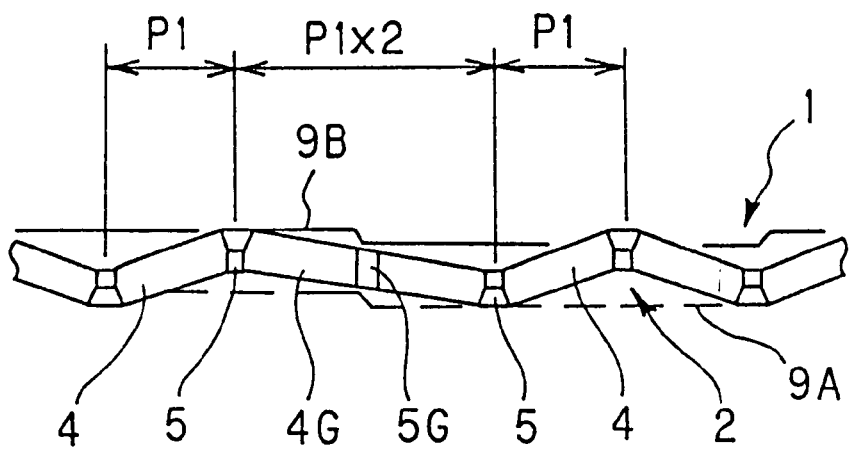

FIG. 16 is a developed view showing teeth of the sprocket shown in FIG. 15.

Figure 17:
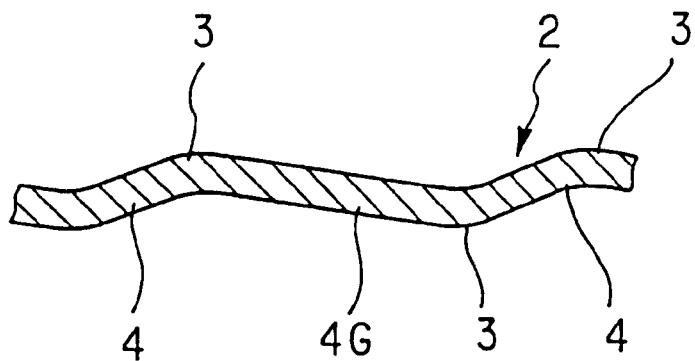

FIG. 17 is a view corresponding to FIG. 8, showing the sprocket shown in FIG. 15.

Figure 18:
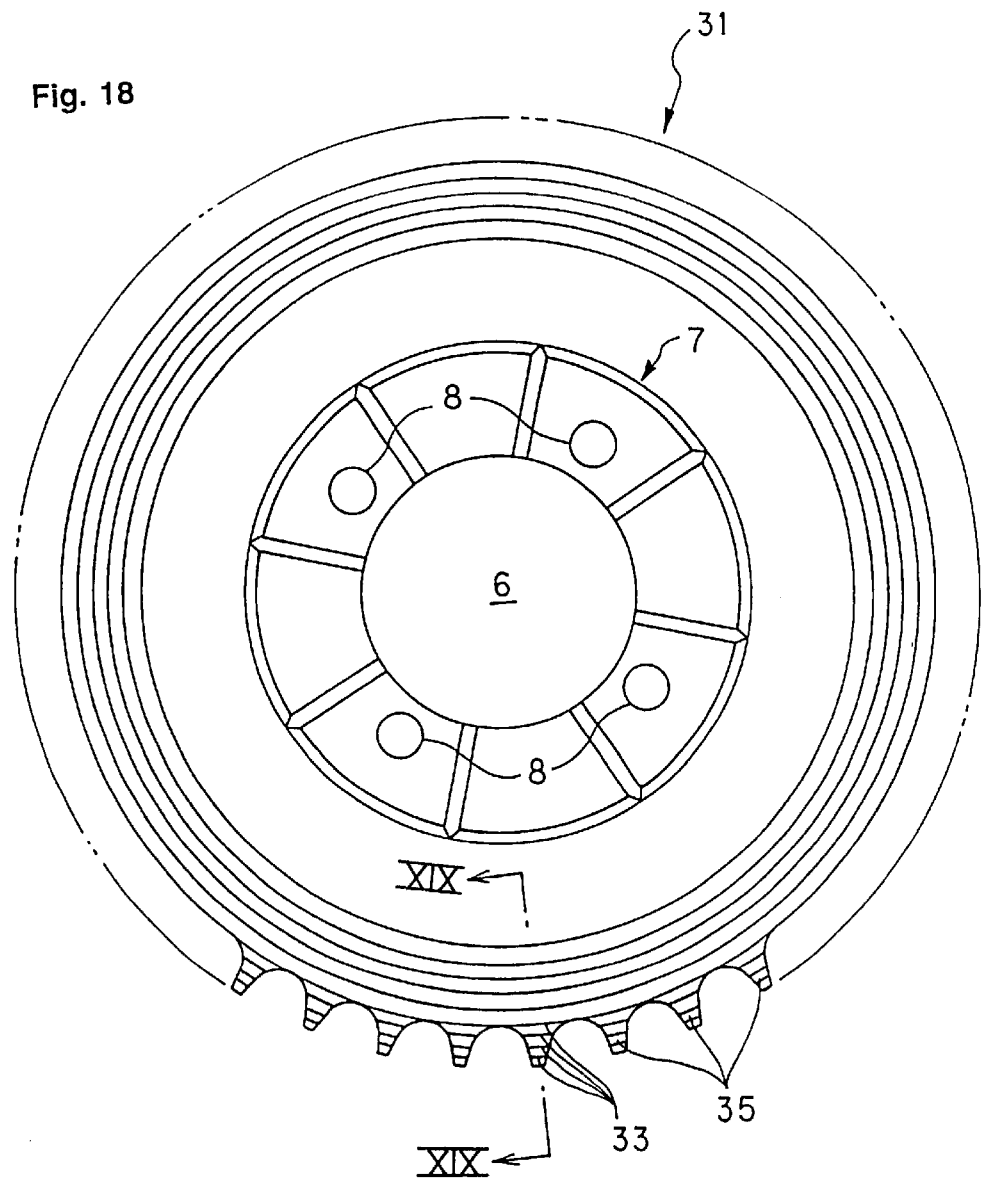

FIG. 18 is a front view showing a sprocket 31 as another embodiment (2) regarding the outer peripheral pail of the sprocket.

Figure 19:
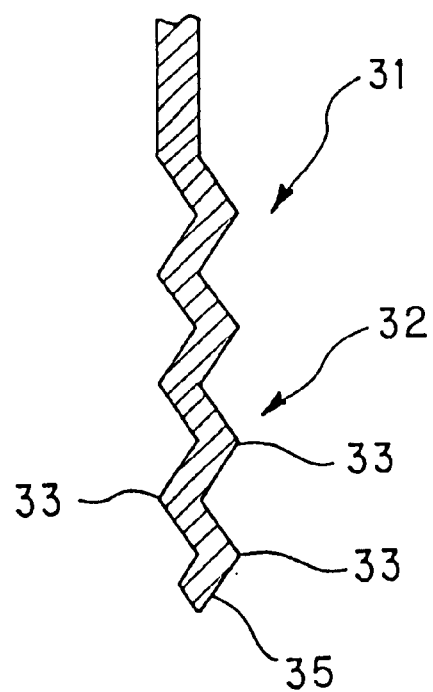

FIG. 19 is a sectional view of the sprocket 31 when taken along line XIX—XIX of FIG. 18.

Figure 20:
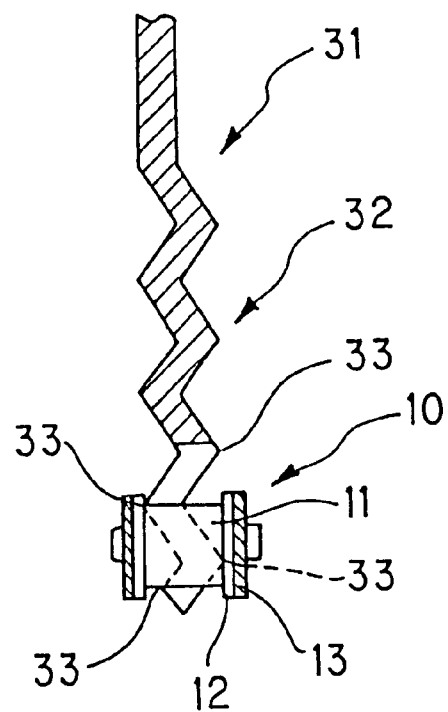

FIG. 20 is a view explaining a status of engagement of the sprocket of FIG. 18 with a chain.

Figure 21:
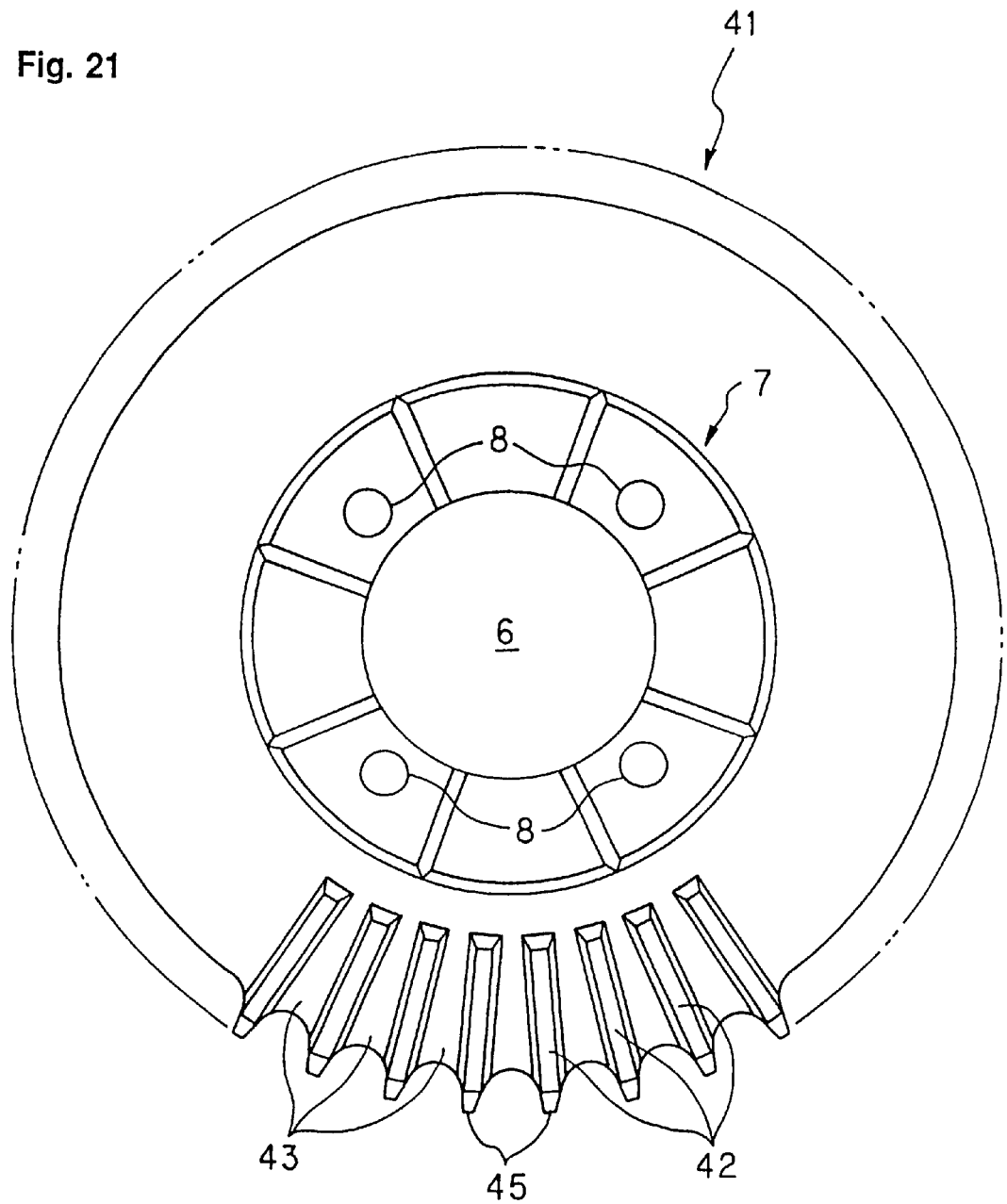

FIG. 21 is a front view showing a sprocket 41 as another embodiment (3) regarding the outer peripheral part of the sprocket.

Figure 22:
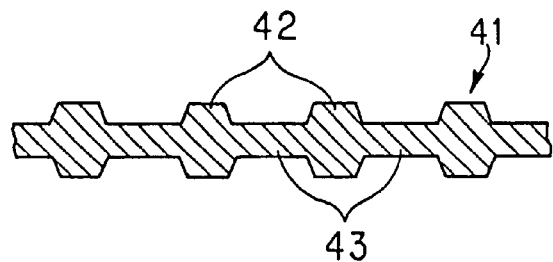

FIG. 22 is a view corresponding to FIG. 8, showing the sprocket shown in FIG. 21.

Figure 23:
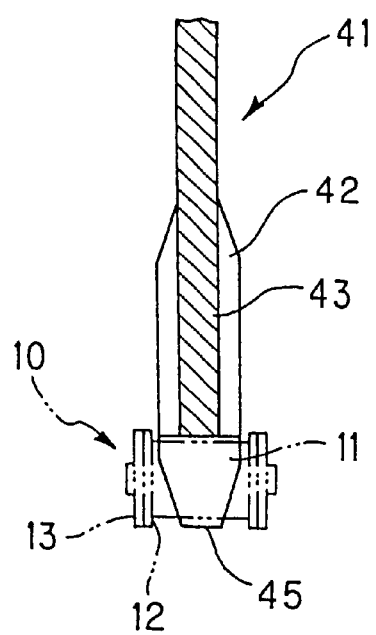

FIG. 23 is a view explaining a status of engagement of the sprocket of FIG. 21 with a chain.

Figure 24:
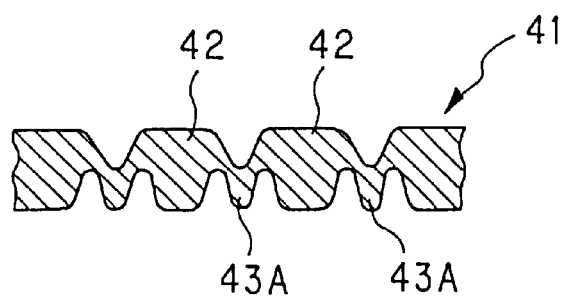

FIG. 24 is a view showing a variation of thick and thin sections as shown in FIG. 22.

Figure 25:
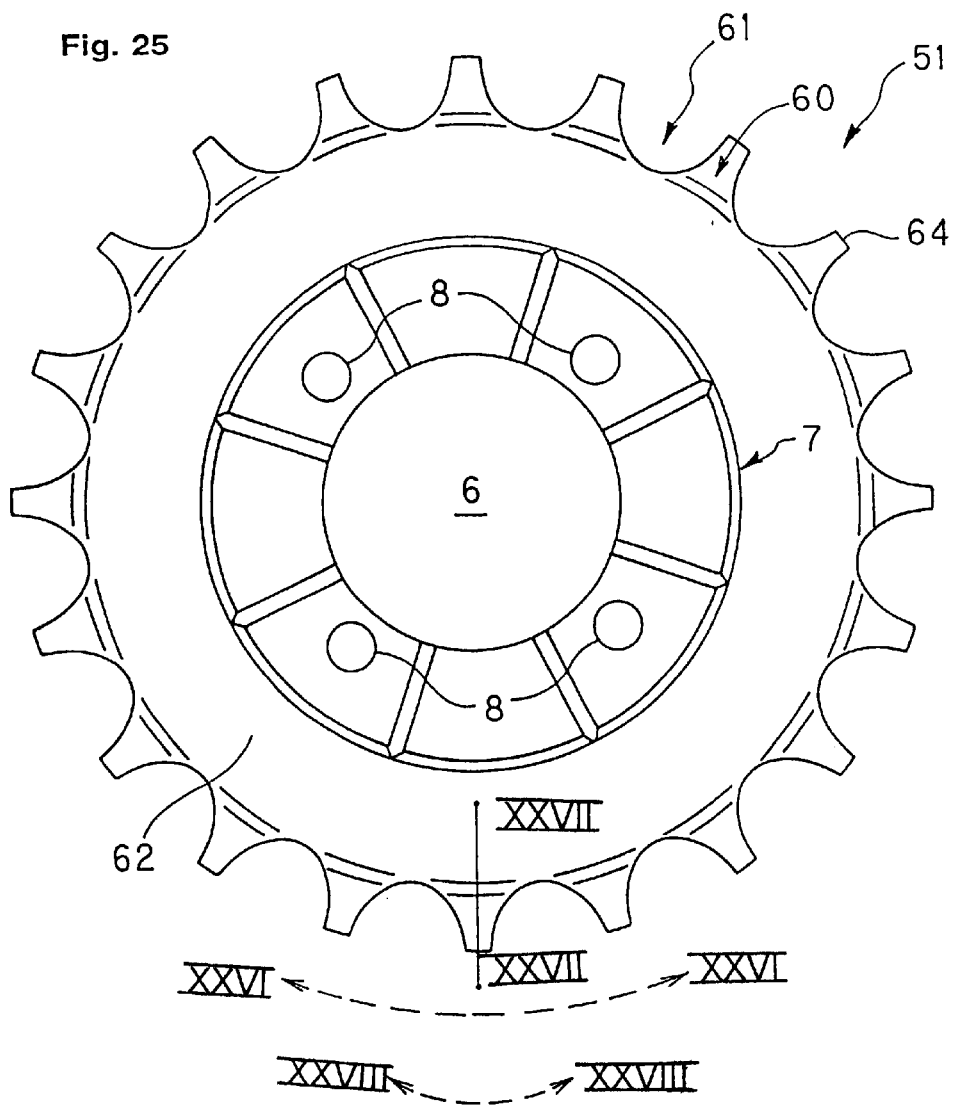

FIG. 25 is a front view showing a sprocket 51 as other embodiments (4) and (5) regarding the outer peripheral part of the sprocket.

Figure 26:
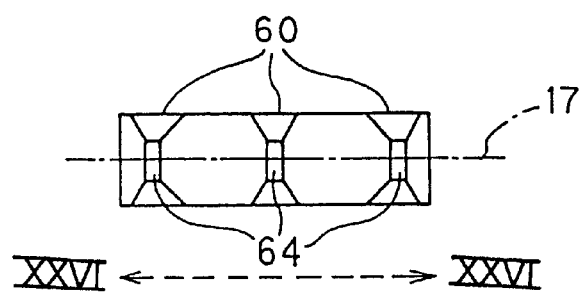

FIG. 26 is a side view showing tooth sections located in the range as indicated by line XXVI—XXVI of the sprocket of FIG. 25 in the embodiment (4).

Figure 27:
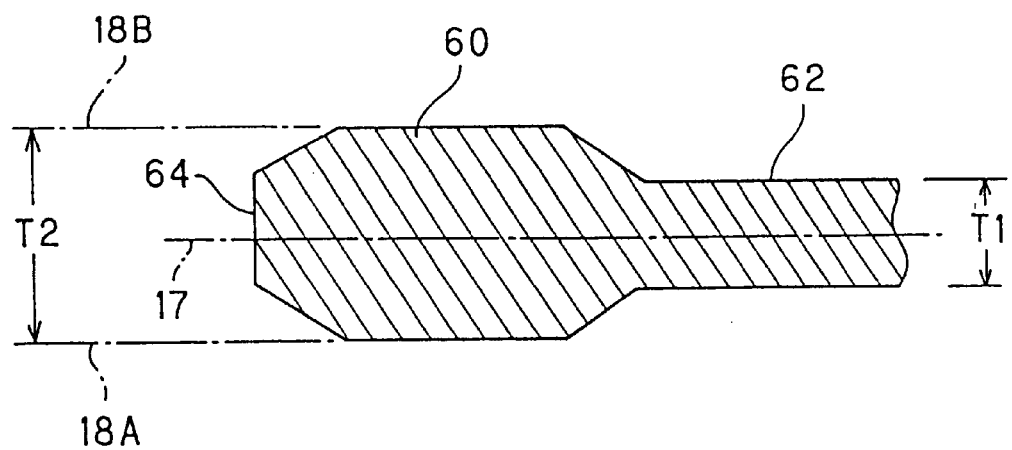

FIG. 27 is a sectional view showing tooth sections when taken along line XXVII—XXVII of the sprocket of FIG. 25 in the embodiment (4).

Figure 28:
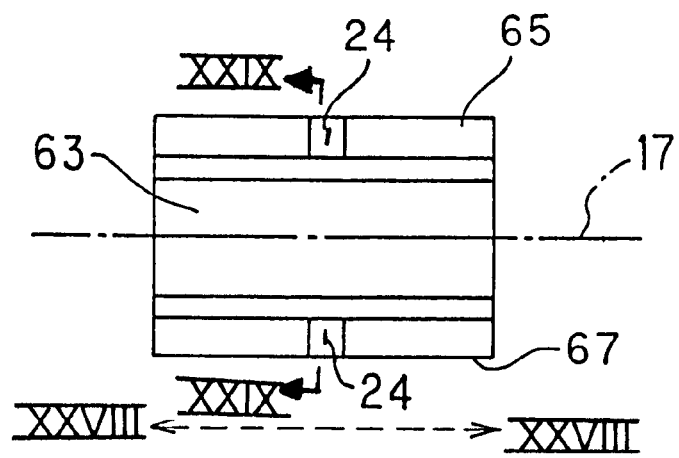

FIG. 28 is a side view showing tooth sections located in the range as indicated by line XXVIII—XXVIII of the sprocket of FIG. 25 in the embodiment (5).

Figure 29:
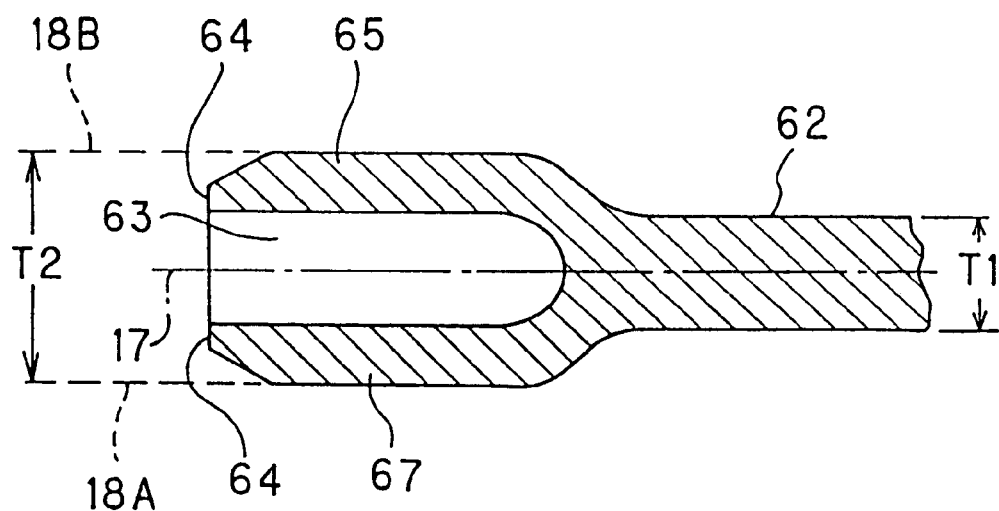

FIG. 29 is a sectional view showing tooth sections when taken along line XXIX—XXIX of the sprocket of FIG. 28 in the embodiment (5).

Figure 30:
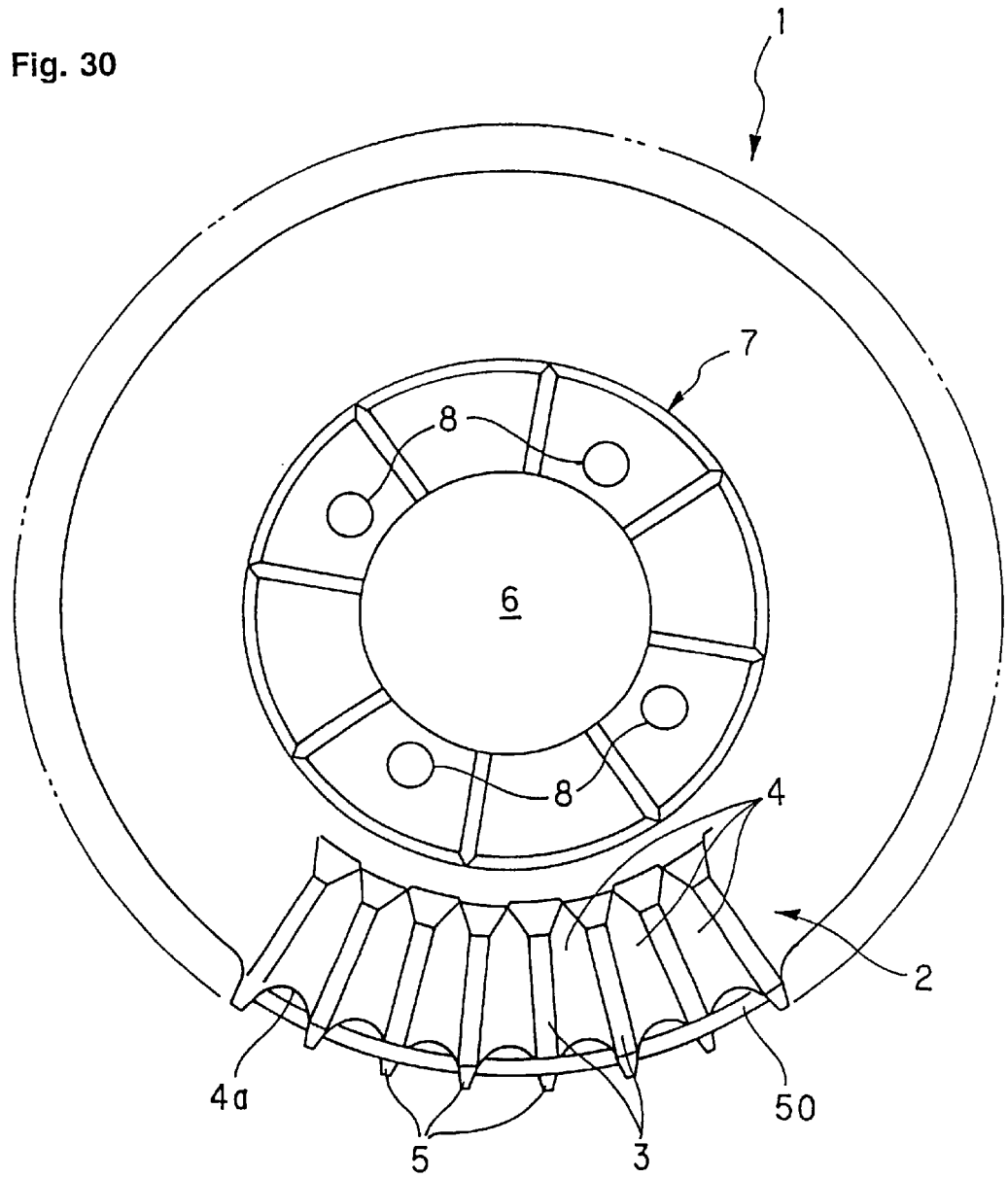

FIG. 30 is a front view showing a sprocket in another embodiment (6) where an annular buffer member is disposed at the tooth section of the sprocket 1 shown in FIG. 1.

Figure 31:
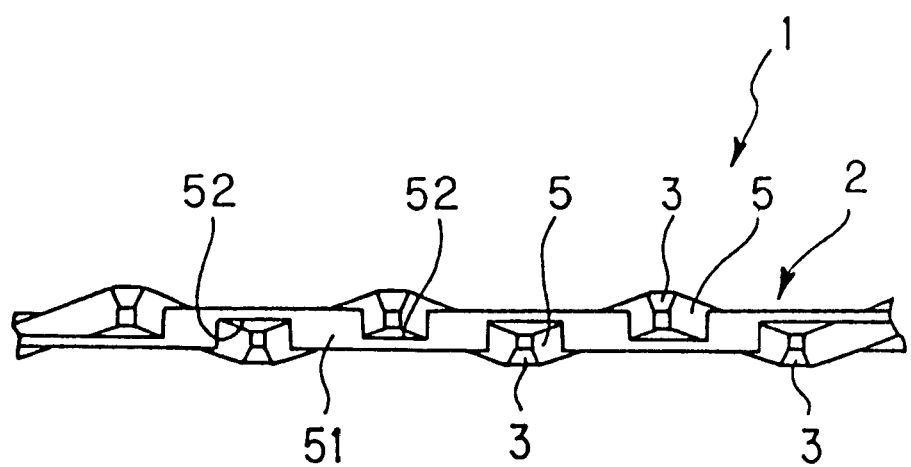

FIG. 31 is a view showing another variation of a buffer member according to the embodiment (6).

Figure 32:
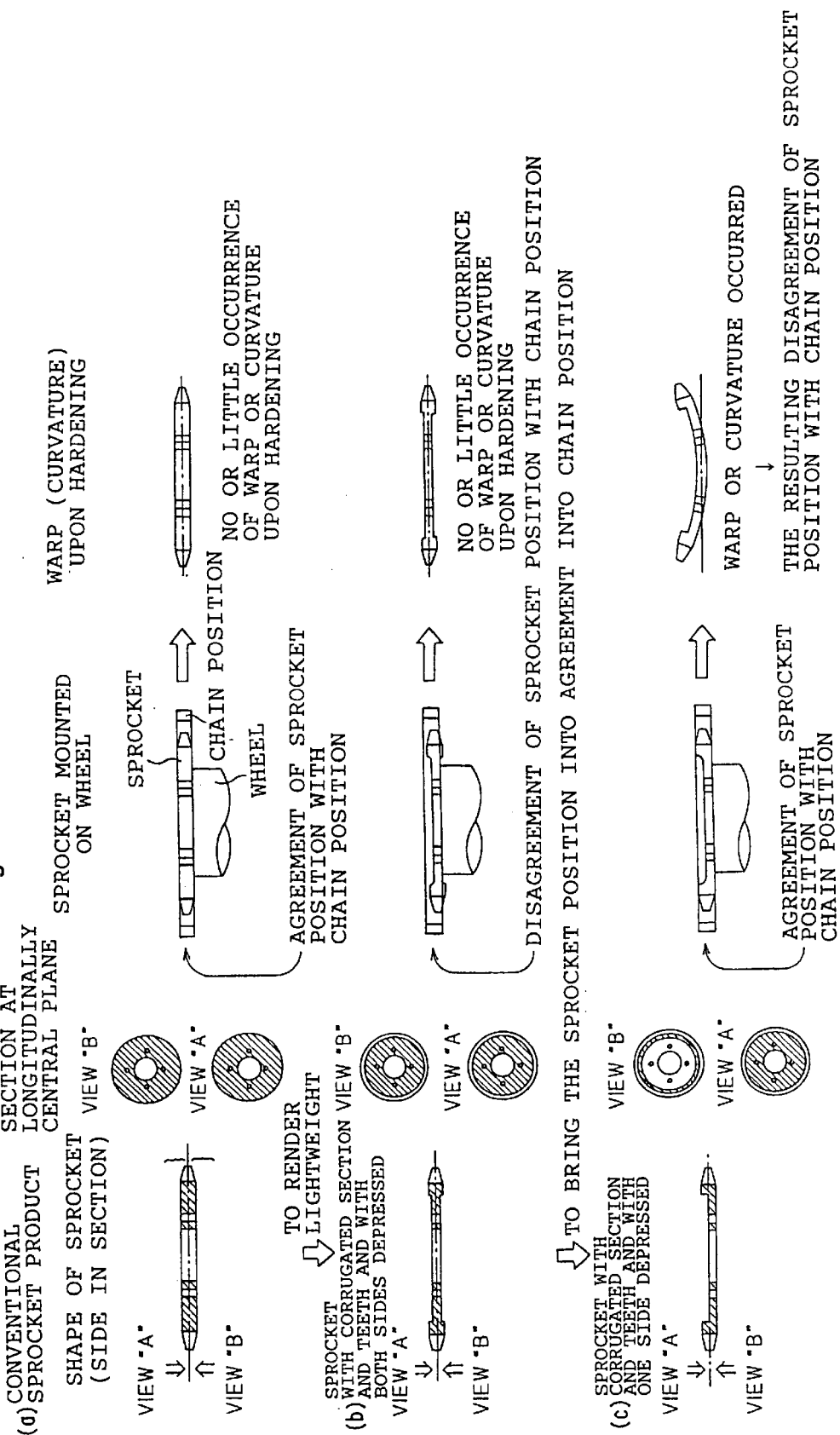

FIGS. 32(a)–(c) are views explaining the background technology, wherein (a) shows a conventional sprocket product; (b) shows a sprocket product with corrugated and teeth sections and with both sides depressed; and (c) shows a sprocket product with corrugated and teeth sections and with one side depressed.

DETAILED DESCRIPTION OF THE INVENTION

The sprocket according to the present invention will be described in more detail with reference to the accompanying drawings.

Figure 2:
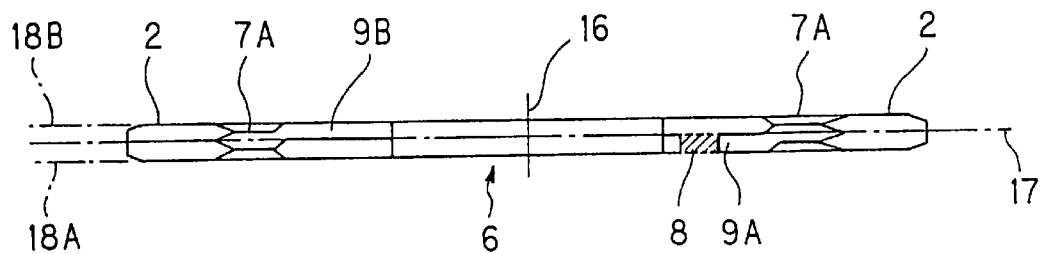
FIG. 2 is a sectional view when taken along line II—II of the sprocket 1 of FIG. 1.

FIGS. 1 and 2 are a front view and a transversely sectional view, respectively, each showing a sprocket according to an embodiment of the present invention. As shown in FIG. 1, a sprocket 1 is a circular plate member having a corrugated section 2 disposed radially and peripherally in a length corresponding to from approximately one third of the radius extending from the outer edge toward the center of the sprocket, the corrugated section 2 having amplitude in the plate thickness direction with folds arranged alternately at a constant and regular cycle along the peripheral direction of the sprocket. At the radial position inside the corrugated section 2, a mounting part 7 acting as a set for mounting on a wheel is disposed via a flat portion 7A. An inner central portion inside the mounting part 7 is provided with a through hole 6 that extends through its entire thickness. The sprocket 1 may be prepared by press molding or any other appropriate means, such as casting. The late thickness for each portion of the sprocket 1 may be set to be as uniformly thin as T1.

The mounting part 7 is unitary and divided peripherally into eight sections each having an equal area, four sections being each arranged as a first raised section 9A and another four sections being each arranged as a second raised section 9B, and the first raised sections 9A and the second raised sections 9B are alternately disposed along the peripheral direction. The first raised sections 9A are each provided with a mounting hole 8, while the second raised sections 9B are each provided with no mounting hole. The raised sections are each of an axially identical shape.

FIG. 2 shows a section of the sprocket 1 extending along line II—II of FIG. 1. As shown in FIG. 2, the sprocket 1 is configured such that the thickness ranging from a bottommost end surface 18A to an uppermost end plane 18B of the sprocket 1 is located within an entire plate thickness T2. In this embodiment, the entire plate thickness T2 of the sprocket 1 is set to become approximately twice the plate thickness T1 of each portion. And the plane extending over the entire area located at the center of the plate thickness of the sprocket is referred to as a longitudinally central plane 17, and the distance to the bottommost end surface 18A of the sprocket 1 is equal to the uppermost end plane 18B thereof between the bottommost end surface 18A and the uppermost end plane 18B of the sprocket 1, each from the longitudinally central plane 17. In this configuration, the bottommost end surface 18A, the longitudinally central plane 17, and the uppermost end surface 18B extend each in the direction perpendicular to the central axis 16 extending through the center of the sprocket 1 along its axial direction.

Figure 3:
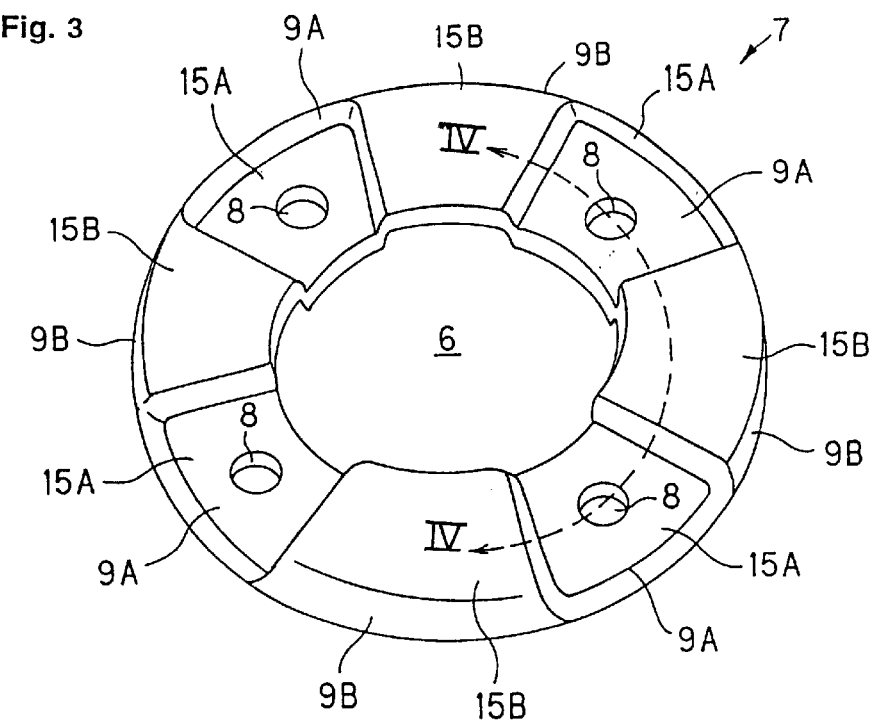
FIG. 3 is a perspective view showing a mounting part 7 of the sprocket of FIG. 1.

FIG. 3 shows a perspective view of the sprocket 1 and FIG. 4 shows a sectional view of the mounting part 7, when taken along line IV—IV of FIG. 3. As shown in FIGS. 2 to 4, each of the first raised sections 9A is raised downwardly from the longitudinally central plane 17 by the plate thickness T1 and, conversely, each of the second raised sections 9B is raised upwardly from the longitudinally central plane 17 by the plate thickness T1, each when looked at the drawings. The top surfaces of the first raised sections 9A extend generally on a level with the longitudinally central plane 17, and the bottom surfaces of the second raised sections 9B extend generally on a level with the longitudinally central plane 17. In other words, the top surfaces of the first raised sections 9A are depressed downward relative to the top surfaces of the second raised-sections 9B, while the bottom surfaces of the first raised sections 9A are depressed downward relative to the bottom surfaces of the second raised sections 9B. Therefore, the mounting part 7 is divided into two divisions with respect to the longitudinally central plane 17, two divisions being equal in volume and weight. The top portions of the first and second raised sections 9A and 9B are each provided with flat top portions 15A and 15B, respectively, which amount each to a majority of the surface area of the raised sections.

As shown in FIGS. 2 and 4, the flat top portion 15A of the first raised section 9A is on a level with the bottommmost end surface of the corrugated section 2, thereby defining the bottommost end surface 18A of the sprocket 1. On the other hand, the flat top portion 15B of the second raised section 9B is on a level with the uppermost end surface of the corrugated section 2, thereby defining the uppermost end surface 18B of the sprocket 1. Therefore, the sprocket 1 as a whole is divided equally in total volume and total weight with respect to the longitudinally central plane 17.

Then, a description will be given regarding the detailed configuration of the corrugated section 2 with reference to FIGS. 6 to 9.

As shown in FIG. 6, the corrugated section 2 comprises a plurality of top portions 3 and a plurality of U-shaped folded portions 4 disposed between the adjacent top portions 3, when looked at the sprocket 1 from the axial direction. The top portions 3 are provided over the sprockets entire peripheral area extending radially each at an equal angle toward the outer edges from the flat portion 7A. Further, a tooth 5 is provided on an outer peripheral edge of each top portion 3, and the tooth 5 is defined by a tooth tip 3a formed at the tip of the top portion 3 and a tooth bottom 4a formed on a U-shaped bottom section of the U-shaped folded portion 4. On the top surface side of the tip of the tooth 5 is formed a chamfered section 5a.

As shown in FIG. 7, when looked at the corrugated section 2 from the peripheral side, the top portions 3 are disposed so as to have amplitude at a constant cycle in the plate thickness direction as will be described in more detail (with reference to FIG. 8). Therefore, the teeth 5 are alternately disposed at a constant cycle at the top and bottom end positions, in association with the disposition of the top portion 3.

The bottommost end portion of the tooth 5 located at the bottom end position is approximately on a level with the bottommost surface 18A of the sprocket 1, and the uppermost end portion of the tooth 5 located at the top end position is approximately on a level with the uppermost surface 18B of the sprocket 1. More specifically, the interval between the uppermost end portion of the tooth 5 located at the top end position and the bottommost end portion of the tooth 5 adjacent thereto is approximately equal in thickness to the entire thickness T2 of the sprocket. If the two teeth 5 would be superimposed over each other imaginarily by deviating them in the peripheral direction, they are configured such that the sectional shape of the virtually superimposed teeth becomes approximately the same sectional shape of one piece of a tooth of a conventional sprocket.

When looked at the section taken along line VIII—VIII of FIG. 6, the corrugated section 2 is configured such that an area in the vicinity of a central part inside the peripheral edge portion thereof is corrugated to amplify at a constant cycle, as shown in FIG. 8. Furthermore, it is found that the section of the top portion 3 disposed in a state of engagement of the teeth 5 with the chain, when taken along line IX—IX of FIG. 6, can perform an appropriate engagement of the tooth 5 of a one top portion 3 (a hatched portion) and the tooth 5 of the adjacent top portion 3 (a blank portion) with the chain having an engaging width corresponding to the thickness T2, as shown in FIG. 9.

When the sprocket 1 having the above configuration is to be mounted on a wheel of a vehicle such as a motorcycle and bicycle, the sprocket 1 is inserted into a rotary shaft of a rear wheel from its bottommost end surface 18A and aligned therewith. After alignment, four bolts are inserted into the respective mounting holes 8 of the sprocket 1 and engaged with the respective mounting thread holes to fix the sprocket 1 to a flange portion of the rotary shaft.

Now, a description will be given regarding the action of the sprocket 1 according to the embodiment of the present invention.

Should the flat top portion 15A of the first raised section 9A be engaged with the flange surface of the wheel and the sprocket 1 of the present invention be mounted on the wheel, as shown in FIG. 5, the flange surface of the wheel is located on a level with the plane position of the bottommost end surface 18A of the sprocket 1. Therefore, the occasion that the flange surface of the wheel is located within the scope of the thickness T2 of the sprocket, as a conventional sprocket product with both sides depressed therein (FIG. 32(b)), does not occur, so that the position of the sprocket can completely agreed with the position of the chain.

If the sprocket 1 is engaged with a chain 10 having a conventional engagement width of the thickness T2 in this configuration, as shown in FIG. 10, the teeth 5 are disposed so as to be alternately engaged with opposite end sides of rollers 11. This configuration can provide an appropriate clearance between each tooth 5 of the sprocket 1 as well as a roller ring plate 12 and a pin ring plate 13, thereby always sustaining an appropriate state of engagement of the sprocket 1 with the chain 10.

In this embodiment, even if the thickness of material of the sprocket 1 is set to approximately half of the conventional thickness as described above, the sprocket 1 can always be engaged with the chain 10 in an appropriate state. Therefore, the sprocket 1 of the present invention can reduce its total volume and weight by using only about half of the material for the sprocket, even without utilizing a hole, etc. that can reduce the volume and weight of the sprocket. The reduction in the amount of material can lead to a decrease in costs of production.

Even if the sprocket 1 were to be hardened, no or little warp or curvature would be caused upon hardening because the total volume and weight of the sprocket 1 is divided equally into plural divisions with respect to the longitudinally central plane 17. Therefore, the position of the sprocket can completely agreed with the position of the chain even after hardening. Further, all the first and second raised sections 9A and 9B are each of equal shape and are each made of equal material, so that the sprocket 1 assumes a symmetrical shape when rotated about a central axis 16. This can also serve to further reducing an occurrence of warping due to hardening.

As described above, the sprocket 1 in this embodiment can have a reduced volume and weight and has no or little warping or curving upon hardening. Furthermore, the sprocket 1 can realize an appropriate state of engagement of the sprocket with the chain because the position of the sprocket thoroughly agrees with the position of the chain.

The sprocket 1 in this embodiment of the present invention can also achieve effects other than those described above by forming the outer peripheral part of the sprocket 1 in a corrugated way. This can enhance strength and rigidity of the sprocket as a whole against curving or warp. Moreover, dirt or muddy water, etc. attached to the sprocket 1 can be smoothly removed outside along grooves 2a of the corrugated section 2, so that damage of the sprocket 1 and the chain 10 caused by attachment of such dirt or muddy water, etc. to the sprocket can be prevented in advance.

It is to be noted herein that, although material is used for the sprocket 1 in this embodiment, which has a plate thickness T1 which is as thick as about a half the entire thickness T2 of the sprocket 1, the thickness for the sprocket is not restricted to such a particular one For instance, the plate thickness T1 may be set to range from ⅘ to ⅕ of the-entire thickness. If the plate thickness T1 would be larger than ⅘ of the entire thickness T2 in the thickness direction of the tooth root of the adjacent tooth 5, the advantage achieved by reducing the weight of the sprocket cannot be enjoyed. On the other hand, if the plate thickness T1 would be less than ⅕ of the entire thickness T2, a sufficient level of strength cannot be ensured. However, if strength could allow, the plate thickness T1 may range from ⅘ to ⅒ of the entire thickness T2.

Should the plate thickness T1 be set to other than a half of the entire thickness T2, it is not necessary for the bottom surface of each raised section to agree with the longitudinally central plane 17. For instance, if the plate thickness T1 is set to T1=T2/3, the sectional shape of each raised section is configured such that the bottom surface of each raised section is located on the raised side apart from the longitudinally central plane 17 and that a space is formed between the longitudinally central plane 17 and the bottom surface thereof, as shown in FIG. 11(A). Alternatively, if the plate thickness T1 is set to T1=2 ×T2/3, the sectional shape of each raised section is configured such that the bottom surface of each raised section is located on the side opposite to the raised side from the longitudinally central plane 17 and the longitudinally central plane 17 extends inside each raised section, as shown in FIG. 11(B). In other words, each raised section may also be formed in such a manner that a partial portion of volume of each raised section is present in the position opposite to the raised side from the longitudinally central plane 17.

The shape and size of each of the raised sections 9A and 9B of the mounting part 7 may be modified and varied in an optional and appropriate manner. For instance, the radius of the mounting part 7B may be enlarged so that the outer periphery of the mounting part 7B comes close to or touches the inner periphery of the corrugated section 2, as shown in FIG. 12. Moreover, as in this configuration, it is not necessary to provide a flat portion 7A. Further, it is also possible to form the outer peripheral part of each raised section in a semi-circular shape, when looked at from the upper side of the sprocket, and to form the adjacent partition of each raised section in a straight wall shape, as shown in FIG. 13. Furthermore, in the embodiment as shown in FIG. 13, as well, the mounting part 7C can be formed so that the semi-circular top portion of each raised section comes close to or touches the inner periphery of the corrugated section 2, like in the embodiment as shown in FIG. 12.

Furthermore, the mounting part 7D may be configured such that each raised section is of a pentagonal shape, when looked from the upper side of the sprocket, as shown in FIG. 14. In this configuration, the partition between adjacent raised sections of the pentagonal shape constitutes a side of each of the pentagonal sides so that a straight wall may be formed at the adjacent sides. In the embodiment as shown in FIG. 14, the mounting part 7D can also be formed so that the pentagonal top portion of each raised section comes close to or touches the inner periphery of the corrugated section 2, like in the embodiment as shown in FIG. 12.

As shown in FIGS. 1 and 12–14, each of the mounting parts may assume a form symmetrical with the rest, when rotated at 90° about the central axis 16. Therefore, the sprocket 1 can be readily prepared and an occurrence of curvature or warp upon hardening can be further decreased.

It is further to be noted herein that the number of raised sections of the mounting part 7 can be modified and varied in an optional and appropriate manner as long as the first raised sections 9A and the second raised sections 9B are alternately disposed along the peripheral direction of the sprocket. For instance, in the embodiments as shown in FIGS. 1 and 12–14, the mounting part 7 is provided with a total number of eight raised sections, i.e., four first raised sections 9A and four second raised sections 9B. It is to be noted, however, that the number of the raised sections is not restricted to eight and it may be 10 or4 or 6.

OTHER EMBODIMENTS

The mounting parts 7 and 7B–7D of the sprocket in the embodiments as described above can present the effects to be achieved by the present invention with a combination of the corrugated section 2 and the outer peripheral part in a variety of forms. Now, a description will be given regarding other embodiments (1) through (6) in which the outer peripheral pails of the sprocket in the above embodiments are varied in a different fashion. It is to be noted herein that the like structured elements of the above embodiments are provided with identical reference numerals and a detailed description is omitted for brevity of explanation.

Embodiment (1)

In the above embodiments as described above, the corrugated section 2 of the sprocket 1 (FIG. 1) is provided with an even number of teeth because it has amplitude at a constant cycle. As the corrugated section 2 of a sprocket 1G in an embodiment as shown in FIGS. 15 to 17, however, the corrugated section 2 may also be provided with an odd number of teeth by setting a pitch of one fold between the adjacent top portions 3 to be twice the pitch P1 of a fold between the other top portions 3, that is, to correspond to two cycles. In this configuration wherein the tooth 5 is provided at the outer peripheral portion of the top portion 3 and a tooth 5G is also provided at the outer peripheral portion in an intermediate position of the folded portion 4G between the adjacent top portions 4G (FIG. 16), the sprocket 1G can be provided with an odd number of the teeth if a number of the folded parts 4G is odd. On the other hand, if a number of the folded parts 4G is even, the sprocket is provided with an even number of the teeth. Should a plurality of the folded parts 4G be provided, they may be preferably provided at a constant cycle along the peripheral direction in order to ensure a balance of the sprocket 1G as a whole.

Embodiment (2)

As shown in FIGS. 18 and 19, a sprocket 31 may be configured such that at least an outer peripheral part of the sprocket 31 is provided with an annular corrugated section 32 having amplitude in the plate thickness direction extending at a constant cycle in a radial direction and that teeth 35 are provided at the outer peripheral portion of the corrugated section 32. As shown in FIG. 20, the adjacent two top portions 33 of the corrugated section 32 with the teeth 35 formed thereon are located between two facing roller ring plates 12, so that the engagement of the sprocket 31 with the chain 10 can be sustained in an appropriate state. It is to be noted herein that the corrugated section 2 may be formed in an optional area including an outer peripheral edge portion of the sprocket 31.

Embodiment (3)

As shown in FIGS. 21 and 22, a sprocket 41 is configured such that thick sections 42 and thin sections 43 are provided at least at the outer peripheral part of the sprocket 41. The thick sections 42 and the thin sections 43 are alternately disposed at a constant interval along the peripheral direction of the sprocket, and a tooth 45 is provided each at an outer edge portion of each of the thick sections 42. As the teeth 45 formed on the thick sections 42 can be engaged with the roller 11 of the chain 10 over its approximately entire length, like the teeth of a conventional sprocket, as shown in FIG. 23, the engagement of the sprocket 41 with the chain 10 can be sustained in an appropriate state. It is further to be noted herein that a thin section 43A in a corrugated shape may also be formed as the thin section 43, as shown in FIG. 24.

Embodiment (4)

As shown in FIG. 25, a sprocket 51 is configured such that a plurality of tooth sections 60 are formed at a constant interval along the peripheral direction of the sprocket at least at the outer peripheral pail of the sprocket, without the formation of any corrugated section provided as in the above embodiments. In addition, a curved tooth groove 61 is formed between the adjacent tooth sections 60. When the tooth sections located within the area as indicated by line XXVI—XXVI of FIG. 25 are looked at from the side of the sprocket, each of the tooth sections 60 extend from its base pail to its peripheral edge wall part 64, as shown in FIG. 26. As indicated in the sectional view of the tooth section 60 (FIG. 27) when taken along line XXVII—XXVII of FIG. 25, the thickness of the tooth section 60 along the axial direction of the sprocket is set to be equal to the entire thickness T2 of the sprocket 51 and to be thicker than the thickness of a flat portion 62 disposed between the mounting part 7 and the tooth section 60, that is, the plate thickness T1 of the mounting part 7. In other words, in the embodiment (4), the tooth section 60 formed at the outer peripheral part of the sprocket is the same as a conventional sprocket (FIG. 32(a)) and the mounting part 7 of the present invention is mounted inside the outer peripheral part thereof.

Embodiment (5)

In order to further reduce weight of the sprocket 51 as shown in FIG. 25, each to the tooth sections 60 may be provided with a groove 63 extending inside from the peripheral edge wall pail 64 in the radial direction of the sprocket, as indicated in a front view (FIG. 28) showing the side portion of the tooth section 60 when taken along line XXVIII—XXVIII of FIG. 25 and in a sectional view (FIG. 29) showing the sectional portion thereof when taken along line XXIX—XXIX of FIG. 28. The groove 63 divides the tooth section 60 having the entire thickness T2 into a first step portion 65 and a second step portion 67, each of the step portions extending in a row along the axial direction of the sprocket. The sprocket in the embodiment (5) can reduce the volume of the tooth section by the volume corresponding to that of the groove 63, so that the sprocket in embodiment (5) is rendered more lightweight than the sprocket in embodiment (4).

Embodiment (6)

In the above embodiments-and embodiments (1) to (5), a noise-reducing means may be provided which can reduce noises caused upon contact of the sprocket with the chain. For instance, as shown in FIG. 30, an annular buffer member 50 may be disposed around the sprocket 1 of FIG. 1, the annular buffer member being made of rubber material having flexibility and elasticity. In this configuration, the buffer member 50 is flexible so that the buffer member is disposed alternately in a forcibly bent state along the teeth so that a portion of the buffer member is arranged outside of the radial direction around the tooth bottoms 4a. The buffer members 50 are then secured to the sprocket with adhesive. As the buffer member 50 is disposed in the vicinity of the tooth bottoms 4a, the roller 11 of the chain 10 is allowed to come into contact with the buffer member 50 upon engagement of the sprocket with the chain 10 so that noises otherwise caused by the contact of the sprocket with the chain 10 can be reduced.

In the embodiment as shown in FIG. 30, the buffer member 50 is formed in a ring-shaped form. A buffer member may also be disposed, as shown in FIG. 31, in such a manner that a ring-shaped buffer member 51 is provided with a depressed part 52 at the portion that in turn comes into contact with the tooth 5 and that it is disposed in a like manner as described above. The depressed parts 52 can be disposed around the sprocket without bending the buffer member 51. Therefore, in this embodiment, the buffer member 51 may also be made of rubber material or any plastic material having no or little flexibility. Moreover, if the depressed parts 52 are shaped so as to agree with the shape of the tooth 5, the buffer member can be mounted on the sprocket without forming any gap between the buffer member 50 and the tooth 5. Although the embodiments as shown in FIGS. 30 and 31 are directed to examples where the buffer member is disposed in a ring-shaped form, it is also possible to provide the buffer member for each tooth bottom 4a (FIG. 30) of the tooth. Should the corrugated section 2 be formed to have amplitude in the thickness direction extending radially at a constant cycle (as in FIG. 1), a buffer member may be embedded in the folded portion on the top and bottom side of the corrugated section 2.

As material for use with the sprocket according to each embodiment of the present invention, there may be used material such as low carbon steel having a carbon content of 0.25% by weight, preferably from 0.10 to 0.20% by weight. If a low carbon steel having a carbon content of larger than 0.25% by weight, on the one hand, is used, hardness can be gained to a sufficient extent, yet costs of production of the material may become expensive leading to increased costs of production of the sprocket itself. In order to reduce costs of the material as much as possible, the carbon content is preferably set to be lower than 0.2% by weight. If the carbon content of low carbon steel is set to be lower than 0.10% by weight, on the other, a so-called Rockwell C hardness becomes 35 or smaller even around the theoretically highest hardness so that an ample level of resistance to abrasion cannot be achieved. It is therefore preferred to set the carbon content of a low carbon steel to 0.10% by weight or higher.

The sprockets according to the present invention can be prepared by processes consisting mainly of press processing by rendering the carbon content of the sprockets lower in the manner as described above. This can simplify the manufacturing process for the production of the sprockets and reduce costs of production to a great extent. Moreover, this serves as readily enhancing precision upon processing.

In the process for the production of the sprockets consisting mainly of press processing, at least tooth sections of the sprocket may also be formed by mechanical processing. This can effectively prevent an occurrence of cracks upon hardening. The gear cutting process may also be carried out by press processing. In this case, however, it is preferred to chamfer after the gear cutting process.

In the process of hardening the sprockets according to the present invention, the hardening process can be conducted by heating the tooth sections of the sprocket at a temperature higher than the A3 transformation temperature (for example, 870° C. or higher) by means of a so-called high frequency heating device and then spraying water onto the tooth sections immediately after interruption of the heating procedure. In this quenching process, the temperature of the tooth sections is allowed to cool rapidly below 500° C. or lower in 0.5 second, thereby allowing the hardness of the tooth sections to reach a range of 35 to 55 in the Rockwell C hardness around the highest theoretical hardness.

The sprockets according to the present invention can be press-processed easily into various forms by setting the carbon content rate of material for use in the sprockets to various values within a predetermined scope. Moreover, the sprockets can ensure a sufficient level of resistance to abrasion by means of the hardening process using a high-frequency heating device or otherwise.

It is to be noted herein that the present invention is not interpreted as being limited to the embodiments as described above and it is readily understood that any modifications and variations are encompassed within the scope without departing from the spirit of the invention.

For instance, in the above embodiments of the present invention, the sprocket of the present invention is divided into divisions that are each substantially equal in the total volume and weight of the sprocket with respect to the longitudinally central plane 17. It is to be noted herein, however, that the present invention is not restricted to this particular feature and divisions of the sprocket which are somewhat less equal in the total volume and weight can also be acceptable as long as warp or curvature of the plane due to hardening can be prevented to a sufficient extent.

Further, in the above embodiments of the present invention, all of the raised sections are equal in shape and volume. The present invention is not restricted, however, to these features. The present invention can encompass within the scope extensions where each of the raised sections are of a different shape. For instance, although each raised section is provided with a flat top portion in the above embodiments, a top portion of the first raised section in a modified embodiment may be of a shape different from that of the second raised section or the first raised section in a modified embodiment may be of a shape different from the second raised section, as long as it can be adapted to the shape of the flange portion of the wheel.

Furthermore, the mounting part 7 may be provided with a portion other than the first raised sections and the second raised sections.

In the above embodiments, the end surface (the bottommost end surface 18A or the uppermost end plane 18B) of the mounting part 7 is set to be on a level with the end surface of the outer peripheral part thereof. The sprocket of the present invention, however, may be of a shape in which the end surface of the mounting part 7 is located axially outside the end surface of the outer peripheral part thereof, if the position of mounting the sprocket on the wheel allows.

Moreover, the above embodiments are directed to the case where the sprocket of the present invention is mounted on the wheel for a motorcycle or other two-wheel vehicles such as bicycle. It is to be understood, however, that the sprocket can be mounted on a rotary member other than the wheel, as long as power can be transmitted via the chain.

In addition, a plurality of holes may be formed at optional and appropriate locations of the sprocket in order to reduce the weight and volume of the sprocket, although not shown in the drawings. For instance, holes may be provided in the flat portion 7A of FIG. 1 or the like or holes other than the mounting hole 8 in the first and second raised sections may be formed in order to reduce the weight of the sprocket.

In the embodiments as described above, the corrugated section 2 has the top portions 3 disposed extending along the radial direction (as shown in FIG. 6). It is also possible to form the corrugated section 2 so that the top portions 3 to incline in the radial direction. This feature can also be applied to the other embodiments in which the top portions 3 are provided.

What is claimed is:

1. A sprocket comprising:
    a mounting part having a rotary axis and adapted to be mounted on a rotary member, said mounting part having a first plate surface side and a second-plate surface side on opposing sides of a plane through said mounting part and perpendicular to the axis; and
    an outer peripheral part having teeth adapted to be engaged with a chain,
    wherein said mounting part comprises at least one first section raised on said first plate surface side and projecting away from said second plate surface side, and at least one second section raised on said second plate surface side and projecting away from said first plate surface side, so as to lessen an occurrence of distortion or curving due to hardening, and
    wherein a top portion of said at least one first section and a top portion of said at least one second section are level with a bottommost end surface and an uppermost end surface of said outer peripheral part, respectively.

2. A sprocket as claimed in claim 1, wherein said at least one first section and said at least one second section are arranged so as to divide a total volume and weight of said sprocket substantially equally at the plane.

3. A sprocket as claimed in claim 1, wherein said at least one first section and said at least one second section each have a flat top portion.

4. A sprocket as claimed in claim 1, wherein said top portion of said at least one first section and said top portion of said at least one second section define a bottommost end surface and an uppermost end surface of said sprocket, respectively.

5. A sprocket as claimed in claim 1, wherein said top portion of either of said at least one first section and said at least one second section is adapted to be engaged with a mounting surface provided on the rotary member.

6. A sprocket as claimed in claim 5, wherein said top portion of either of said at least one first section and said at least one second section which is adapted to be engaged with the mounting surface of the rotary member is provided with a mounting hole.

7. A sprocket as claimed in claim 1, wherein said at least one first section comprises a plurality of first sections and said at least one second section comprises a plurality of second sections.

8. A sprocket as claimed in claim 7, wherein said plurality of first sections and said plurality of second sections are alternately disposed along a peripheral direction of said sprocket.

9. A sprocket as claimed in claim 1, wherein said mounting part is symmetrical when rotated at a predetermined angle about the rotary axis of said sprocket.

10. A sprocket as claimed in claim 1, wherein said at least one first section and said at least one second section are substantially identical in shape and said at least one first section and said at least one second section are provided in equal number.

11. A sprocket as claimed in claim 1, wherein a plate thickness of said mounting part is smaller than an entire thickness of said outer peripheral part.

12. A sprocket as claimed in claim 11, wherein said sprocket as a whole is made of material having a uniform plate thickness.

13. A sprocket as claimed in claim 11, wherein a plate thickness of material for said mounting part is thinner than a plate thickness of material for said outer peripheral part.

14. A sprocket as claimed in claim 1, wherein said outer peripheral part is provided with a corrugated section having a plurality of folds and a plurality of top portions, said corrugated section having amplitude in a thickness direction of said outer peripheral part and extending along a peripheral direction of said outer peripheral part, and one of said teeth is formed at least at an outer edge part of each of said plurality of top portions between an adjacent pair of said plurality of folds of said corrugated section.

15. A sprocket as claimed in claim 14, further comprising a buffer member disposed at said outer peripheral part, said buffer member being adapted to reduce noise caused by contact between said sprocket and a chain.

16. A sprocket as claimed in claim 1, wherein said outer peripheral part is provided with an annular corrugated section, said annular corrugated section having amplitude in a thickness direction of said outer peripheral part and extending along a radial direction of said outer peripheral part, and said teeth are provided on an outer peripheral portion of said corrugated section.

17. A sprocket as claimed in claim 1, wherein said outer peripheral part has a plurality of thick sections and a plurality of thin sections alternately disposed along a peripheral direction on said outer peripheral part and one of said teeth is provided on an outer edge portion of each of said plurality of thick sections.

18. A sprocket as claimed in claim 1, wherein each of said teeth formed at said outer peripheral part is provided with two tooth edge portions facing each other in a thickness direction of said outer peripheral, part, and a groove extending in a radial direction of said outer peripheral part is provided between said two tooth edge parts of each of said teeth.

19. A sprocket as claimed in claim 1, wherein said mounting part has a hole formed therein in order to reduce a weight of said sprocket.

20. A sprocket comprising:

a mounting part having a rotary axis and adapted to be mounted on a rotary member, said mounting part having a first plate surface side and a second plate surface side on opposing sides of a plane through said mounting part and perpendicular to the axis; and an outer peripheral part having teeth adapted to be engaged with a chain, wherein said mounting part comprises at least one first section raised on said first plate surface side and projecting away from said second plate surface side, and at least one second section raised on said second plate surface side and projecting away from said first plate surface side, so as to lessen an occurrence of distortion or curving due to hardening, wherein said outer peripheral part is provided with a corrugated section having a plurality of folds and a plurality of top portions, said corrugated section having amplitude in a thickness direction of said outer peripheral part and extending along a peripheral direction of said outer peripheral part, and one of said teeth is formed at least at an outer edge part of each of said plurality of top portions between an adjacent pair of said plurality of folds of said corrugated section, and wherein a pitch of at least one of said plurality of folds between an adjacent pair of said plurality of top portions of said corrugated section is set to be different from a pitch of another fold between another adjacent pair of said plurality of top portions, and one of said teeth is formed at an outer edge portion in an intermediate position of said at least one of said plurality of folds between said adjacent pair of said plurality of top portions.

21. A sprocket comprising:

a mounting part having a rotary axis and adapted to be mounted on a rotary member, said mounting part having a first plate surface side and a second plate surface side on opposing sides of a plane through said mounting part and perpendicular to the axis; and an outer peripheral part having teeth adapted to be engaged with a chain, wherein said mounting part is unitary and comprises at least one first section raised on said first plate surface side and at least one second section raised on said second plate surface side, so as to lessen an occurrence of distortion or curving due to hardening, wherein said outer peripheral part is provided with a corrugated section having a plurality of folds and a plurality of top portions, said corrugated section having amplitude in a thickness direction of said outer peripheral part and extending along a peripheral direction of said outer peripheral part, and one of said teeth is formed at least at an outer edge part of each of said plurality of top portions between an adjacent pair of said plurality of folds of said corrugated section, and wherein a pitch of at least one of said plurality of folds between an adjacent pair of said plurality of top portions of said corrugated section is set to be different from a pitch of another fold between another adjacent pair of said plurality of top portions, and one of said teeth is formed at an outer edge portion in an intermediate position of said at least one of said plurality of folds between said adjacent pair of said plurality of top portions.

\* \* \* \* \*